US012690030B2

(12) United States Patent　(10) Patent No.:　US 12,690,030 B2
Liu et al.　(45) Date of Patent:　Jul. 21, 2026

(54) METHOD AND DEVICE FOR POWER CONTROL IN WIRELESS COMMUNICATION

(71) Applicant: Apogee 5G Global, LLC, Plano, TX (US)

(72) Inventors: Zheng Liu, Shanghai (CN); Xiaobo Zhang, Shanghai (CN)

(73) Assignee: Apogee 5G Global, LLC, Plano, TX (US)

( * ) Notice: Subject to any disclaimer, the term of this patent is extended or adjusted under 35 U.S.C. 154(b) by 199 days.

(21) Appl. No.: 18/228,686

(22) Filed: Aug. 1, 2023

(65) Prior Publication Data

US 2024/0049220 A1　Feb. 8, 2024

(30) Foreign Application Priority Data

Aug. 5, 2022　(CN) .......................... 202210935364.3

(51) Int. Cl.
　*H04W 72/12*　(2023.01)
　*H04W 72/1268*　(2023.01)
　*H04W 72/232*　(2023.01)
(52) U.S. Cl.
　CPC ..... *H04W 72/1268* (2013.01); *H04W 72/232* (2023.01)
(58) Field of Classification Search
　CPC ............... H04W 72/23; H04W 72/232; H04W 72/1268; H04W 72/0446; H04W 72/1273; H04W 72/20; H04W 48/12; H04W 72/04; H04W 8/24; H04L 5/0044; H04L 5/0053
　See application file for complete search history.

(56) References Cited

U.S. PATENT DOCUMENTS 10,341,961 B2　7/2019　Cheng
10,484,950 B1　11/2019　Gong et al.
10,708,866 B2　7/2020　Papasakellariou
(Continued)

FOREIGN PATENT DOCUMENTS

WO　2021147892 A1　7/2021

OTHER PUBLICATIONS

Third Generation Partnership Project, "Technical Specification Group Radio Access Network; NR; Physical channels and modulation (Release 17)," 3GPP TS 38.211 V17.2.0 (Jun. 2022).

(Continued)

*Primary Examiner* — Khalid W Shaheed
(74) *Attorney, Agent, or Firm* — Volpe Koenig

(57)　ABSTRACT

A user equipment (UE) is configured to receive a first information block and a downlink control information (DCI) comprising at least a first field and a second field. The UE is configured to determine a target waveform based on a value of the first field. The UE is configured to send a physical uplink shared channel (PUSCH) transmission using the determined target waveform and using a target power value. The target power value is equal to a smaller value of a first upper limit value or a first power value. A first parameter value is used to determine the first upper limit value. The first parameter value is related to the target waveform. A second parameter value is used to determine the first power value. The second parameter value is related to both a value of the second field comprised in the DCI and the target waveform.

14 Claims, 5 Drawing Sheets

(56)     References Cited

U.S. PATENT DOCUMENTS

| | | | |
|---|---|---|---|
| 2018/0270799 A1* | 9/2018 | Noh | H04L 27/261 |
| 2018/0279274 A1* | 9/2018 | Sun | H04W 52/50 |
| 2023/0209511 A1* | 6/2023 | Ying | H04W 72/23 |
| | | | 370/329 |
| 2023/0276504 A1* | 8/2023 | Kim | H04W 74/0833 |
| | | | 370/329 |

OTHER PUBLICATIONS

Third Generation Partnership Project, "Technical Specification Group Radio Access Network; NR; Physical layer procedures for control (Release 17)," 3GPP TS 38.213 V17.2.0 (Jun. 2022).

Third Generation Partnership Project, "Technical Specification Group Radio Access Network; NR; Physical layer procedures for data (Release 17)," 3GPP TS 38.214 V17.2.0 (Jun. 2022).

Third Generation Partnership Project, "Technical Specification Group Radio Access Network; NR; Radio Resource Control (RRC) protocol specification (Release 17)," 3GPP TS 38.331 V17.1.0 (Jun. 2022).

* cited by examiner

100

| MCS index | Modulation order | Target code rate | Spectral efficiency |
|---|---|---|---|
| 0 | $a_0$ | $b_0$ | $c_0$ |
| 1 | $a_1$ | $b_1$ | $c_1$ |
| 2 | $a_2$ | $b_2$ | $c_2$ |
| 3 | $a_3$ | $b_3$ | $c_3$ |
| 4 | $a_4$ | $b_4$ | $c_4$ |
| 5 | $a_5$ | $b_5$ | $c_5$ |
| 6 | $a_6$ | $b_6$ | $c_6$ |
| 7 | $a_7$ | $b_7$ | $c_7$ |
| 8 | $a_8$ | $b_8$ | $c_8$ |
| ... | ... | ... | ... |
| R | $a_R$ | $b_R$ | $c_R$ |

1200

1300

METHOD AND DEVICE FOR POWER CONTROL IN WIRELESS COMMUNICATION

CROSS REFERENCE TO RELATED APPLICATIONS

This application claims the priority benefit of Chinese Patent Application 202210935364.3, filed on Aug. 5, 2022, the full disclosure of which is incorporated herein by reference.

BACKGROUND

Technical Field

The present application relates to transmission methods and devices in wireless communication systems, and in particular to a transmission scheme and device of uplink transmission in wireless communications.

Related Art

Application scenarios of future wireless communication systems are becoming increasingly diversified, and different application scenarios have different performance demands on systems. In order to meet different performance requirements of various application scenarios, it was decided at 3rd Generation Partner Project (3GPP) Radio Access Network (RAN) #72th plenary that a study on New Radio (NR), or what is called Fifth Generation (5G) shall be conducted. A work item of NR was approved at 3GPP RAN #75th plenary to standardize NR.

In uplink transmission of the new radio technology, two waveforms of both Cyclic Prefix-Orthogonal Frequency Division Multiplexing (CP-OFDM) and Discrete Fourier Transform-Spread-Orthogonal Frequency Division Multiplexing (DFT-s-OFDM) are supported. These two waveforms can meet different application needs for different application scenarios.

SUMMARY

In R17 and previous versions of 5G New Radio (NR), a waveform for uplink transmission is mainly configured in a semi-persistent manner. In the R18 version, it is planned to support a configuration of dynamic uplink transmission waveforms.

The present application discloses a solution to the power control problems faced in the configuration procedure of dynamic uplink transmission waveforms. It should be noted that in the description of the present application, dynamic waveform configuration is only illustrated as a typical application scenario or example; the present application is also applicable to other scenarios facing similar problems (such as other scenarios with dynamic changes in coverage or high-speed movement, including but not limited to capacity enhancement systems, systems using higher frequency, coverage enhancement systems, unlicensed frequency-domain communications, Internet of Things (IoT), Ultra Reliable Low Latency Communication (URLLC) networks, Vehicle-to-everything, etc.), where similar technical effects can also be achieved. Additionally, the adoption of a unified solution for various scenarios, including but not limited to scenarios of multicarrier, contributes to the reduction of hardware complexity and costs. If no conflict is incurred, embodiments in a first node in the present application and the characteristics of the embodiments are also applicable to a second node, and vice versa. Particularly, for interpretations of the terminology, nouns, functions and variants (if not specified) in the present application, refer to definitions given in TS36 series, TS37 series and TS38 series of 3GPP specifications.

The present application provides a method in a first node for wireless communications, comprising:

receiving a first information block and receiving a first DCI format, the first information block being used to determine the first DCI format; and transmitting a first PUSCH, a waveform adopted by the first PUSCH being a target waveform, the target waveform being one of X1 candidate waveforms, X1 being a positive integer greater than 1;

herein, the first DCI format at least comprises a first field and a second field, and the first field and the second field are respectively two different fields; a value of the first field comprised in the first DCI format is used to determine the target waveform from the X1 candidate waveforms; a target power value is equal to a transmission power value of the first PUSCH, and the target power value is equal to a smaller value between a first upper limit value or a first power value; a first parameter value is used to determine the first upper limit value, and the first parameter value is related to the target waveform; a second parameter value is used to determine the first power value, the second parameter value is related to both a value of the second field comprised in the first DCI format and the target waveform.

According to an aspect of the present application, the above method is characterized in that a value of the second field comprised in the first DCI format is used to determine a BPRE value of the first PUSCH, the first power value is linearly correlated with the second parameter value, and a unit of the first power value is dBm; a characteristic sub-parameter value and a BPRE value of the first PUSCH are both used to determine the second parameter value; the characteristic sub-parameter value belongs to a first sub-parameter value set, the first sub-parameter value set comprises at least one sub-parameter value, and the first sub-parameter value set is predefined or configured; the target waveform is used to determine the characteristic sub-parameter value from the first sub-parameter value set.

According to one aspect of the present application, the above method is characterized in that the first DCI format is used to determine a target offset value, and the target waveform is used to determine a power control adjustment state adopted by the first PUSCH; the target offset value belongs to a first offset value set, the first offset value set comprises at least one offset value, any offset value comprised in the first offset value set is for a power control adjustment state adopted by the first PUSCH, and a sum of all offset values comprised in the first offset value set is used to determine the second parameter value.

According to one aspect of the present application, the above method is characterized in that the first PUSCH carries a first report, the first report is used to indicate a difference value between the first upper limit value and the target power value, and the first DCI format is an earliest DCI format after the first report is triggered.

According to one aspect of the present application, the above method is characterized in that the first DCI format comprises a third field, a target size is equal to a size of the third field comprised in the first DCI format, and the target size is equal to a maximum candidate size among multiple candidate sizes corresponding to the X1 candidate waveforms.

According to one aspect of the present application, the above method is characterized in comprising:

receiving a second information block;

herein, the second information block is used to determine a reference waveform, and the reference waveform is one of the X1 candidate waveforms; the reference waveform is a default waveform adopted for an uplink transmission when the first field is absent.

According to one aspect of the present application, the above method is characterized in that an MCS adopted by the first PUSCH belongs to a first MCS set, the first MCS set comprises multiple MCSs, the first DCI format is used to determine an MCS adopted by the first PUSCH from the first MCS set, and the target waveform is used to determine the first MCS set.

The present application provides a method in a second node for wireless communications, comprising:

transmitting a first information block and transmitting a first DCI format, the first information block being used to determine the first DCI format; and receiving a first PUSCH, a waveform adopted by the first PUSCH is a target waveform, the target waveform being one of X1 candidate waveforms, X1 being a positive integer greater than 1;

herein, the first DCI format at least comprises a first field and a second field, and the first field and the second field are respectively two different fields; a value of the first field comprised in the first DCI format is used to determine the target waveform from the X1 candidate waveforms; a target power value is equal to a transmission power value of the first PUSCH, and the target power value is equal to a smaller value between a first upper limit value or a first power value; a first parameter value is used to determine the first upper limit value, and the first parameter value is related to the target waveform; a second parameter value is used to determine the first power value, the second parameter value is related to both a value of the second field comprised in the first DCI format and the target waveform.

According to an aspect of the present application, the feature of the above method is that a value of the second field comprised in the first DCI format is used to determine a BPRE value of the first PUSCH, the first power value is linearly correlated with the second parameter value, and a unit of the first power value is dBm; a characteristic sub-parameter value and a BPRE value of the first PUSCH are both used to determine the second parameter value; the characteristic sub-parameter value belongs to a first sub-parameter value set, the first sub-parameter value set comprises at least one sub-parameter value, and the first sub-parameter value set is predefined or configured; the target waveform is used to determine the characteristic sub-parameter value from the first sub-parameter value set.

According to one aspect of the present application, the above method is characterized in that the first DCI format is used to determine a target offset value, and the target waveform is used to determine a power control adjustment state adopted by the first PUSCH; the target offset value belongs to a first offset value set, the first offset value set comprises at least one offset value, any offset value comprised in the first offset value set is for a power control adjustment state adopted by the first PUSCH, and a sum of all offset values comprised in the first offset value set is used to determine the second parameter value.

According to one aspect of the present application, the above method is characterized in that the first PUSCH carries a first report, the first report is used to indicate a difference value between the first upper limit value and the target power value, and the first DCI format is an earliest DCI format after the first report is triggered.

According to one aspect of the present application, the above method is characterized in that the first DCI format comprises a third field, a target size is equal to a size of the third field comprised in the first DCI format, and the target size is equal to a maximum candidate size among multiple candidate sizes corresponding to the X1 candidate waveforms.

According to one aspect of the present application, the above method is characterized in comprising:

transmitting a second information block;

herein, the second information block is used to determine a reference waveform, and the reference waveform is one of the X1 candidate waveforms; the reference waveform is a default waveform adopted for an uplink transmission when the first field is absent.

According to one aspect of the present application, the above method is characterized in that an MCS adopted by the first PUSCH belongs to a first MCS set, the first MCS set comprises multiple MCSs, the first DCI format is used to determine an MCS adopted by the first PUSCH from the first MCS set, and the target waveform is used to determine the first MCS set.

The present application provides a first node for wireless communications, comprising:

a first receiver, receiving a first information block and receiving a first DCI format, the first information block being used to determine the first DCI format;

a first transmitter, transmitting a first PUSCH, a waveform adopted by the first PUSCH is a target waveform, the target waveform being one of X1 candidate waveforms, X1 being a positive integer greater than 1;

herein, the first DCI format at least comprises a first field and a second field, and the first field and the second field are respectively two different fields; a value of the first field comprised in the first DCI format is used to determine the target waveform from the X1 candidate waveforms; a target power value is equal to a transmission power value of the first PUSCH, and the target power value is equal to a smaller value between a first upper limit value or a first power value; a first parameter value is used to determine the first upper limit value, and the first parameter value is related to the target waveform; a second parameter value is used to determine the first power value, the second parameter value is related to both a value of the second field comprised in the first DCI format and the target waveform.

The present application provides a second node for wireless communications, comprising:

a second transmitter, transmitting a first information block and transmitting a first DCI format, the first information block being used to determine the first DCI format;

a second receiver, receiving a first PUSCH, a waveform adopted by the first PUSCH is a target waveform, the target waveform being one of X1 candidate waveforms, X1 being a positive integer greater than 1;

herein, the first DCI format at least comprises a first field and a second field, and the first field and the second field are respectively two different fields; a value of the first field comprised in the first DCI format is used to determine the target waveform from the X1 candidate waveforms; a target power value is equal to a transmission power value of the first PUSCH, and the target power value is equal to a smaller value between a first upper limit value or a first power value; a first parameter value is used to determine the first upper limit value, and the first parameter value is related to the target waveform; a second parameter value is used to determine the first power value, the second parameter value is related to both a value of the second field comprised in the first DCI format and the target waveform.

BRIEF DESCRIPTION OF THE DRAWINGS

Other features, objects and advantages of the present application will become more apparent from the detailed description of non-restrictive embodiments taken in conjunction with the following drawings.

DESCRIPTION OF THE EMBODIMENTS

The technical scheme of the present application is described below in further details in conjunction with the drawings. It should be noted that the embodiments of the present application and the characteristics of the embodiments may be arbitrarily combined if no conflict is caused.

Embodiment 1

Figure 1:
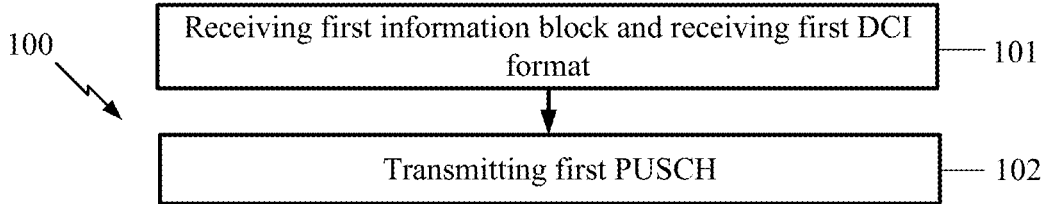
FIG. 1 illustrates a flowchart of a first information block, a first DCI format and a first PUSCH according to one embodiment of the present application.

Embodiment 1 illustrates flowchart 100 of a first information block, a first DCI format and a first PUSCH according to one embodiment of the present application, as shown in FIG. 1. In FIG. 1, each box represents a step. Particularly, the sequential order of steps in these boxes is just an example, which does not necessarily mean that the steps are chronologically arranged.

In Embodiment 1, a first node in the present application receives a first information block and a first DCI format in step 101, and the first information block is used to determine the first DCI format; the first node in the present application transmits a first PUSCH in step 102, a waveform adopted by the first PUSCH is a target waveform, the target waveform is one of X1 candidate waveforms, X1 being a positive integer greater than 1; herein, the first DCI format at least comprises a first field and a second field, and the first field and the second field are respectively two different fields; a value of the first field comprised in the first DCI format is used to determine the target waveform from the X1 candidate waveforms; a target power value is equal to a transmission power value of the first PUSCH, and the target power value is equal to a smaller value between a first upper limit value or a first power value; a first parameter value is used to determine the first upper limit value, and the first parameter value is related to the target waveform; a second parameter value is used to determine the first power value, the second parameter value is related to both a value of the second field comprised in the first DCI format and the target waveform.

In one embodiment, the uplink transmission performance under different waveform conditions is ensured by that a second parameter value is related to both a value of a second field comprised in a first DCI format and a target waveform.

In one embodiment, the first information is transmitted via an air interface or a radio interface.

In one embodiment, the first information block comprises all or part of a higher-layer signaling or physical-layer signaling.

In one embodiment, the first information block comprises all or part of a Radio Resource Control (RRC)-layer signaling, or the first information block comprises all or part of a Medium Access Control (MAC)-layer signaling.

In one embodiment, the first information block comprises all or part of a System Information Block (SIB).

In one embodiment, the first information block is UE-specific.

In one embodiment, the first information block is per-carrier configured, or the first information block is per-bandwidth part (BEP) configured, or the first information block is per-band or per-frequency range (FR) configured.

In one embodiment, the first information block comprises all or partial fields in a Downlink Control Information (DCI) format.

In one embodiment, the first information block comprises all or part in an Information Element (IE) "PUSCH-Config"; or the first information block comprises all or part in an IE "BWP-UplinkDedicated"; or the first information block comprises all or part in an IE "BWP-Uplink"; or the first information block comprises all or part in an IE "Serving-CellConfig"; or the first information block comprises all or part in an IE "UplinkConfig".

In one embodiment, the first information block comprises all or part in an IE "ConfiguredGrantConfig".

In one embodiment, the first information block comprises all or part in an IE "PTRS-UplinkConfig".

In one embodiment, the first information block comprises all or part in an IE "PUSCH-ConfigCommon".

In one embodiment, the first information block comprises a higher-layer parameter "msg3-transformPrecoder" or "msgA-TransformPrecoder".

In one embodiment, the first information block comprises a higher-layer parameter "transformPrecoder".

In one embodiment, the first information block comprises all or part of IE "pdcch-ConfigCommon", or the first information block comprises all or part of IE "BWP-Downlink-Common", or the first information block comprises all or part of IE "BWP-DownlinkDedicated", or the first information block comprises all or part of IE "pdcch-Config", or the first information block comprises all or part of IE "SearchSpace", or the first information block comprises all or part of IE "SearchSpaceExt-v1800", or the first information block comprises all or part of IE "SearchSpaceExt2-r18".

In one embodiment, the technical feature that "the first information block is used to determine the first DCI format" comprises the following meaning: the first information block is used by the first node in the present application to determine the first DCI format.

In one embodiment, the technical feature that "the first information block is used to determine the first DCI format" comprises the following meaning: all or part comprised in the first information block is used to explicitly or implicitly indicate the first DCI format.

In one embodiment, the technical feature that "the first information block is used to determine the first DCI format" comprises the following meaning: the first information block is used to explicitly or implicitly indicate that the first DCI format comprises at least one field.

In one embodiment, the technical feature that "the first information block is used to determine the first DCI format" comprises the following meaning: the first information block is used to explicitly or implicitly indicate whether the first DCI format comprises the first field.

In one embodiment, the technical feature that "the first information block is used to determine the first DCI format" comprises the following meaning: the first information block is used to configure a search space set that supports the first DCI format.

In one embodiment, the technical feature that "the first information block is used to determine the first DCI format" comprises the following meaning: the first information block is used to configure at least one DCI format supported by a search space set, and at least one DCI format supported by a search space set configured by the first information block comprises the first DCI format.

In one embodiment, all DCI formats supported by a search space set configured with the first DCI format support comprising the first field.

In one embodiment, only partial DCI formats in all DCI formats supported by a search space set configured with the first DCI format support comprising the first field.

In one embodiment, the technical feature that "the first information block is used to determine the first DCI format" comprises the following meaning: all or part comprised in the first information block is used to explicitly or implicitly indicate a dynamic conversion of an uplink waveform, and a dynamic conversion of an uplink waveform is used to determine that the first DCI format comprises the first field.

In one embodiment, the technical feature that "the first information block is used to determine the first DCI format" comprises the following meaning: all or part comprised in the first information block is used to explicitly or implicitly indicate dynamically enabling/disabling or on/off transform precoding (or transform precoder), and dynamic enabling/ disabling or on/off transform precoding (or transform precoder) is used to determine that the first DCI format comprises the first field.

In one embodiment, the technical feature that "the first information block is used to determine the first DCI format" comprises the following meaning: a characteristic field is a field comprised in the first information block; when a value of the characteristic field comprised in the first information block is equal to a value (or a state), the first DCI format comprises the first field; when a value of the characteristic field comprised in the first information block is equal to another value (or another state), the first DCI format does not comprise the first field.

In one embodiment, the technical feature that "the first information block is used to determine the first DCI format" comprises the following meaning: the first information block is configured or provided to determine that the first DCI format comprises the first field.

In one embodiment, the technical feature that "the first information block is used to determine the first DCI format" comprises the following meaning: when the first information block is configured or provided, the first DCI format comprises the first field; when the first information block is not configured or provided, the first DCI format does not comprise the first field.

In one embodiment, the technical feature that "the first information block is used to determine the first DCI format" comprises the following meaning: when the first information block is configured or provided, the first DCI format does not comprise the first field; when the first information block is not configured or provided, the first DCI format comprises the first field.

In one embodiment, the technical feature that "the first information block is used to determine the first DCI format" comprises the following meaning: when all or part comprised in the first information block explicitly or implicitly indicates disabling transform precoding (transform precoder), the first DCI format comprises the first field; when all or part comprised in the first information block explicitly or implicitly indicate enabling transform precoding (transform precoder), the first DCI format does not comprise the first field.

In one embodiment, the technical feature that "the first information block is used to determine the first DCI format" comprises the following meaning: all or part comprised in the first information block is used to explicitly or implicitly indicate an uplink waveform, and the uplink waveform indicated by the first information block is used to determine whether the first DCI format comprises the first field.

In one embodiment, the technical feature that "the first information block is used to determine the first DCI format" comprises the following meaning: all or part comprised the first information block is used to explicitly or implicitly indicate whether to enable/disable or on/off transform precoding (or transform precoder), and the enabled/disabled or on/off state of the transform precoding (or transform precoder) indicated by the first information block is used to determine whether the first DCI format comprises the first field.

In one embodiment, the two expressions that "the first information block is provided" and "the first DCI format comprises the first field" are equivalent or can be used interchangeably.

In one embodiment, the two expressions that "the first information block is configured" and "the first DCI format comprises the first field" are equivalent or can be used interchangeably.

In one embodiment, the two expressions that "a value of a parameter comprised in the first information block is equal to a first higher-layer parameter value" and "the first DCI format comprises the first field" are equivalent or can be used interchangeably, and the first higher-layer parameter value is predefined or configurable.

In one embodiment, the two expressions that "a value of a parameter comprised in the first information block is equal to a second higher-layer parameter value" and "the first DCI format does not comprise the first field" are equivalent or can be used interchangeably, and the second higher-layer parameter value is predefined or configurable.

In one embodiment, the two expressions that "a value of a parameter comprised in the first information block indicates support for dynamically enabling/disabling or on/off transform precoding (or transform precoder) and "the first DCI format comprises the first field" are equivalent or can be used interchangeably.

In one embodiment, the two expressions that "a value of a parameter comprised in the first information block indicates dynamically enabling/disabling or on/off transformation precoding (or transform precoder is not supported or the first information block is not provided (or not configured)" and "the first DCI format does not comprise the first field" are equivalent or can be used interchangeably.

In one embodiment, the two expressions that "a value of a parameter comprised in the first information block indicates dynamically switching waveform" and "the first DCI format comprises the first field" are equivalent or can be used interchangeably.

In one embodiment, the two expressions that "a value of a parameter comprised in the first information block indicates that dynamically switching waveform is not supported" and "the first DCI format does not comprise the first field" are equivalent or can be used interchangeably.

In one embodiment, the two expressions that "a value of a parameter comprised in the first information block indicates that dynamically switching waveform is not supported or the first information block is not provided (or is not configured)" and "the first DCI format does not comprise the first field" are equivalent or can be used interchangeably.

In one embodiment, the two expressions that "a value of a parameter comprised in the first information block indicates disabling transform precoding (or transform precoder) and "the first DCI format comprises the first field" are equivalent or can be used interchangeably.

In one embodiment, the two expressions that "a value of a parameter comprised in the first information block indicates enabling transform precoding (or transform precoder)" and "the first DCI format comprises the first field" are equivalent or can be used interchangeably.

In one embodiment, the first information block comprises transform precoding (or transform precoder) enabling/disabling or on/off state of the first Physical Uplink Shared Channel (PUSCH) when transform precoding (or transform precoder) enabling/disabling or on/off parameters in a configuration signaling of the PUSCH is default.

In one embodiment, the first DCI format is a DCI format used for scheduling a PUSCH.

In one embodiment, the first DCI format is 0_1, or the first DCI format is 0_2, or the first DCI format is 0_K, or the first DCI format is one of 0_2 and 0_K, or the first DCI format is one of 0_1, 0_2 and 0_K, or the first DCI format is one of 0_1 and 0_2, or the first DCI format is one of 0_1 and 0_K; where K is a positive integer greater than 2. In one subsidiary embodiment of the above embodiment, K is equal to 3. In one subsidiary embodiment of the above embodiment, K is equal to 4. In one subsidiary embodiment of the above embodiment, K is equal to 5.

In one embodiment, the first DCI format is 0_0.

In one embodiment, the first DCI format is a DCI format other than 0_0.

In one embodiment, a DCI format group to which the first DCI format belongs is pre-defined or configured.

In one embodiment, a DCI format group to which the first DCI format belongs is configured by a signaling configuring a PDCCH.

In one embodiment, a DCI format group configured through a configuration signaling of a search space comprises the first DCI format.

In one embodiment, the first DCI format is a DCI format scheduling an uplink channel or signal.

In one embodiment, the first DCI format is one of DCI formats supported by a UE-Specific Search Set (USS set).

In one embodiment, at least one DCI format configured through a configuration signaling of a UE-specific search space set comprises the first DCI format.

In one embodiment, the first DCI format is transmitted through a Physical Downlink Control Channel (PDCCH).

In one embodiment, the first DCI format is used to generate a PDCCH.

In one embodiment, the first DCI format comprises a payload bit or information bit of a PDCCH.

In one embodiment, the first DCI format comprises multiple fields, and the multiple fields comprised in the first DCI format comprises the first field and the second field.

In one embodiment, a Radio Network Temporary Identity (RNTI) scrambled by a CRC of a PDCCH carrying the first DCI format is a C-RNTI or an MCS-RNTI.

In one embodiment, an RNTI scrambled by a CRC of a PDCCH carrying the first DCI format is a C-RNTI.

In one embodiment, an RNTI scrambled by a CRC of a PDCCH carrying the first DCI format is a C-RNTI, an MCS-RNTI or an SP-CSI-RNTI.

In one embodiment, an RNTI scrambled by a CRC of a PDCCH carrying the first DCI format is a CS-RNTI, a C-RNTI, an MCS-RNTI or an SP-CSI-RNTI.

In one embodiment, the first PUSCH is a dynamically-scheduled PUSCH.

In one embodiment, the first PUSCH is a PUSCH of configured grant.

In one embodiment, the first PUSCH is a PUSCH of Type 1 configured grant.

In one embodiment, the first PUSCH is a PUSCH of Type 2 configured grant.

In one embodiment, the first PUSCH carries Uplink Control Information (UCI).

In one embodiment, the first PUSCH does not carry UCI.

In one embodiment, the first PUSCH carries an Uplink shared channel (UL-SCH).

In one embodiment, the first PUSCH does not carry a UL-SCH.

In one embodiment, the first PUSCH is a baseband signal of a PUSCH.

In one embodiment, the first PUSCH is an RF signal of a PUSCH.

In one embodiment, the technical feature that "a waveform adopted by the first PUSCH is a target waveform" comprises the following meaning: the target waveform is used for a transmission of the first PUSCH.

In one embodiment, the technical feature that "a waveform adopted by the first PUSCH is a target waveform"

comprises the following meaning: the target waveform is used for generating a baseband signal or an RF signal of the first PUSCH.

In one embodiment, the technical feature that "a waveform adopted by the first PUSCH is a target waveform" comprises the following meaning: the first PUSCH uses the target waveform for transmission.

In one embodiment, the technical feature that "a waveform adopted by the first PUSCH is a target waveform" comprises the following meaning: the first PUSCH adopts a transform precoder (on or off) corresponding to the target waveform.

In one embodiment, the technical feature that "a waveform adopted by the first PUSCH is a target waveform" comprises the following meaning: a modulation symbol used to generate the first PUSCH adopts the target waveform to generate a baseband signal or an RF signal of the first PUSCH.

In one embodiment, the technical feature that "a waveform adopted by the first PUSCH is a target waveform" comprises the following meaning: a type of an OFDM corresponding to the target waveform is used to generate a baseband signal or an RF signal of the first PUSCH.

In one embodiment, the technical feature that "a waveform adopted by the first PUSCH is a target waveform" comprises the following meaning: an uplink transmission waveform adopted (or configured) by a transmitter of the first PUSCH is the target waveform.

In one embodiment, "CP-OFDM waveform" and "transform precoding (or transform precoder) being disabled" are equivalent or can be used interchangeably.

In one embodiment, "DFT-s-OFDM waveform" and "transform precoding (or transform precoder) being enabled" are equivalent or can be used interchangeably.

In one embodiment, "CP-OFDM waveform" and "transform precoding (or transform precoder) that executes a DFT extension being disabled" are equivalent or can be used interchangeably.

In one embodiment, "DFT-s-OFDM waveform" and "transform precoding (or transform precoder) that executes a DFT extension being enabled" are equivalent or can be used interchangeably.

In one embodiment, "the target waveform being a CP-OFDM" and "transform precoding (or transform precoder) in the generation of the first PUSCH being disabled" are equivalent or can be used interchangeably.

In one embodiment, "the target waveform being a DFT-s-OFDM" and "transform precoding (or transform precoder) in the generation of the first PUSCH being enabled" are equivalent or can be used interchangeably.

In one embodiment, the target waveform is an OFDM using CP with enabled/disabled transform precoding.

In one embodiment, the target waveform is generated by Inverse Discrete Fourier Transform (IDFT) or Inverse Fast Fourier Transform (IFFT) at baseband.

In one embodiment, the target waveform is generated through precoding transform and OFDM.

In one embodiment, the target waveform is a Cyclic Prefix Orthogonal Frequency Division Multiplexing (CP-OFDM), or the target waveform is a Discrete Fourier Transform Prepare Orthogonal Frequency Division Multiplexing (DFT-S-OFDM).

In one embodiment, the target waveform is a Single Carrier Frequency Division Multiple Access (SC-FDMA), or target waveform is a Circularly Pulse Shaped Orthogonal Frequency Division Multiplexing (CPS-OFDM), or target waveform is a Filter Bank Orthogonal Frequency Division Multiplexing (FB-OFDM).

In one embodiment, the target waveform is one of Cyclic Prefix Less Precoded OFDM (CPLP-OFDM), a Flexibly Configured OFDM (FC-OFDM), a Flexible CP-OFDM (FCP-OFDM), a Flexi-OFDM, a Unique Word Discrete Fourier Transform spread Orthogonal Frequency Division Multiplexing (UW DFT-S-OFDM), an Orthogonal Time Frequency Space (OTFS), a Windowed OFDM (W-OFDM), and a Filtered OFDM (F-OFDM).

In one embodiment, the target waveform is generated through windowing on the basis of OFDM.

In one embodiment, the target waveform is generated through Filtering on the basis of OFDM.

In one embodiment, X1 is equal to 2.

In one embodiment, X1 is greater than 2.

In one embodiment, the X1 candidate waveforms are X1 candidate waveforms in CP-OFDM, DFT-S-OFDM, CPS-OFDM, FB-OFDM, CPLP-OFDM, FC-OFDM, FCP-OFDM, Flexi-OFDM, UW DFT-S-OFDM, OTFS, W-OFDM and F-OFDM.

In one embodiment, X1 is equal to 2, and the X1 candidate waveforms are respectively CP-OFDM and DFT-S-OFDM.

In one embodiment, X1 is equal to 2, and the X1 candidate waveforms are respectively an OFDM with transform precoding (or transform precoder) turned off and an OFDM with transform precoding (or transform precoder) turned on.

In one embodiment, X1 is equal to 2, and the X1 candidate waveforms are respectively an OFDM using a CP when transform precoding (or transform precoder) executing a DFT extension is disabled and an OFDM using a CP when transform precoding (or a transform precoder) executing a DFT extension is enabled.

In one embodiment, X1 is equal to 2, the X1 candidate waveforms respectively correspond to transformation precoding (or transform precoder) executing a DFT extension being disabled and enabled.

In one embodiment, X1 is equal to 2, the X1 candidate waveforms are respectively transform precoding (or transform precoder) executing a DFT extension and transform precoding (or transform precoder) not executing a DFT extension.

In one embodiment, X1 is equal to 3, and the X1 candidate waveforms are respectively CP-OFDM, DFT-S-OFDM, and OTFS.

In one embodiment, X1 is equal to 3, and the X1 candidate waveforms are respectively CP-OFDM, DFT-S-OFDM, and Flexi-OFDM.

In one embodiment, X1 is equal to 4, and the X1 candidate waveforms are respectively CP-OFDM, DFT-S-OFDM, OTFS, and Flexi-OFDM.

In one embodiment, the X1 candidate waveforms are predefined.

In one embodiment, the X1 candidate waveforms are fixed.

In one embodiment, the X1 candidate waveforms are hard coded in the protocol.

In one embodiment, the X1 candidate waveforms are signaling-configured.

In one embodiment, the first DCI format also comprises a field other than the first field or the second field.

In one embodiment, the first field only comprises one bit.

In one embodiment, the first field comprises multiple bits.

In one embodiment, the first field is a newly introduced field in version 18 (Rel 18).

In one embodiment, the first field is an existing field in version 17 (Rel 17) or previous versions.

In one embodiment, the first field is a field for re interpreting existing fields in version 17 (Rel 17) or previous versions In one embodiment, the definition of the first field is version dependent.

In one embodiment, the definition of the first field is independent of the version.

In one embodiment, the first field is a "transform precoder indicator" field.

In one embodiment, the first field is a "waveform indicator" field.

In one embodiment, the first field is a "CP-OFDM/DFT-s-OFDM indicator" field.

In one embodiment, the second field is a "Modulation and coding scheme" field, or the second field is a "Time domain resource assignment" field, or the second field is a "Frequency domain resource assignment" field, or the second field is an "SRS resource set indicator" field, or the second field is an "SRS resource indicator" field, or the second field is an "Second SRS resource indicator" field, or the second field is a "Precoding information and number of layers" field, or the second field is an "Antenna ports" field, or the second field is an "SRS request" field, or the second field is an "SRS offset indicator" field, or the second field is a "beta offset indicator" field, or the second field is a "UL SCH indicator" field, or the second field is an "Open-loop power control parameter set indication" field, or the second field is an "SCell dormancy indication" field, or the second field is a "TPC command for scheduled PUSCH" field.

In one embodiment, the second field is a field related to sounding reference signal (SRS).

In one embodiment, the second field is used to determine an SRS resource indication and an association relation between pre-coding information and an SRS resource set.

In one embodiment, the second field is used to explicitly or implicitly indicate SRS resources.

In one embodiment, the second field is used to explicitly or implicitly indicate SRS resources from an SRS resource set.

In one embodiment, the second field is used to explicitly or implicitly indicate a modulation and coding scheme (MCS) adopted by the first PUSCH.

In one embodiment, the second field is used to explicitly or implicitly indicate frequency-domain resources or time-domain resources occupied by the first PUSCH.

In one embodiment, the second field is used to explicitly or implicitly indicate whether the first PUSCH carries an Uplink Shared Channel (UL-SCH).

In one embodiment, the definition (or interpretation) of the second field is related to the target waveform.

In one embodiment, the definition (or interpretation) of the second field is unrelated to the target waveform.

In one embodiment, the second field comprises at least one padding bit.

In one embodiment, the second field does not comprise any padding bit.

In one embodiment, the second field is neither a starting field nor an ending field comprised in the first DCI format.

In one embodiment, the technical feature that "a value of the first field comprised in the first DCI format is used to determine the target waveform from the X1 candidate waveforms" comprises the following meaning: a value of the first field comprised in the first DCI format is used by the first node in the present application to determine the target waveform from the X1 candidate waveforms.

In one embodiment, the technical feature that "a value of the first field comprised in the first DCI format is used to determine the target waveform from the X1 candidate waveforms" comprises the following meaning: a value of the first field comprised in the first DCI format is used to explicitly or implicitly indicate the target waveform from the X1 candidate waveforms.

In one embodiment, the technical feature that "a value of the first field comprised in the first DCI format is used to determine the target waveform from the X1 candidate waveforms" and "a value of the first field comprised in the first DCI format is used to explicitly or implicitly indicate whether to adopt transform precoding (transform precoder)" are equivalent or can be used interchangeably.

In one embodiment, the technical feature that "a value of the first field comprised in the first DCI format is used to determine the target waveform from the X1 candidate waveforms" and "a value of the first field comprised in the first DCI format is used to explicitly or implicitly indicate enabling/disabling of transform precoding (transform precoder)" are equivalent or can be used interchangeably.

In one embodiment, the technical feature that "a value of the first field comprised in the first DCI format is used to determine the target waveform from the X1 candidate waveforms" comprises the following meaning: when a value of the first field comprised in the first DCI format is equal to a value, the target waveform is one of the X1 candidate waveforms; when a value of the first field comprised in the first DCI format is equal to another value, the target waveform is another one of the X1 candidate waveforms.

In one embodiment, the technical feature that "a value of the first field comprised in the first DCI format is used to determine the target waveform from the X1 candidate waveforms" comprises the following meaning: when a value of the first field comprised in the first DCI format is equal to a value, transform precoding (transform precoder) is enabled; when a value of the first field comprised in the first DCI format is equal to another value, transform precoding (transform precoder) is disabled.

In one embodiment, the technical feature that "a value of the first field comprised in the first DCI format is used to determine the target waveform from the X1 candidate waveforms" comprises the following meaning: a value of the first field comprised in the first DCI format is equal to one of X1 candidate values, and the X1 candidate values respectively correspond the X1 candidate waveforms, the target waveform is a candidate waveform corresponding to a value of the first field comprised in the first DCI format.

In one embodiment, the target power value is measured by dBm.

In one embodiment, the target power value is measured by watts or milliwatts.

In one embodiment, the target power value is equal to a PUSCH transmission occasion in which the first PUSCH belongs in time domain and transmission power in an uplink BWP to which the first PUSCH belongs in frequency domain.

In one embodiment, the target power value is equal to an average value of power of an MCS adopted by the first PUSCH at all constellation points In one embodiment, the target power value is equal to a normalized transmission power value of the first PUSCH.

In one embodiment, the target power value is equal to average value of energy of all constellation points in a modulation method adopted by the first PUSCH.

In one embodiment, the target power value is transmission power value of the first PUSCH at the antenna connector.

In one embodiment, the target power value is transmission power value of a baseband of the first PUSCH.

In one embodiment, the target power value is transmission power value of the first PUSCH at radio frequency.

In one embodiment, the target power value does not comprise antenna gain.

In one embodiment, the target power value comprises antenna gain.

In one embodiment, the target power value is equal to a value of $P_{PUSCH,b,f,c}(i, j, q_d, l)$ of the first PUSCH.

In one embodiment, the first upper limit value is a value of $P_{CMAX,f,c}(i)$ corresponding to the first PUSCH.

In one embodiment, the first upper limit value is configured maximum output power of a transmitter of the first PUSCH.

In one embodiment, the first upper limit value is configured maximum output power of a transmitter of the first PUSCH in a carrier occupied by a serving cell to which the first PUSCH belongs and in a PUSCH transmission occasion to which the first PUSCH belongs in time domain.

In one embodiment, the first upper limit value is a power value related to RF characteristics of a transmitter of the first PUSCH in the first PUSCH.

In one embodiment, the first power value is a transmission power value of the first PUSCH when transmission power does not exceed the first upper limit value.

In one embodiment, the first power value is a transmission power value obtained by controlling power of the first PUSCH.

In one embodiment, the first power value is a transmission power value calculated through open-loop power control and close-loop power control during a transmission of the first PUSCH.

In one embodiment, the first power value is a transmission power value related to path loss (PL) of a transmitter of the first PUSCH.

In one embodiment, the first power value is a power value used to calculate transmission power of the first PUSCH and comprising close-loop power control.

In one embodiment, the first power value is a power value related to a value of bit per resource element (BPRE).

In one embodiment, the first power value is equal to a sum of a value of $P_{O\_PUSCH,b,f,c}(j)$ corresponding to the first PUSCH, a value of $$10\log_{10}\left(2^\mu \cdot M_{RB,b,f,c}^{PUSCH}(i)\right)$$

corresponding to the first PUSCH, a value of $\alpha_{b,f,c}(j)\cdot PL_{b,f,c}(q_d)$ corresponding to the first PUSCH, a value of $\Delta_{TF,b,f,c}(i)$ corresponding to the first PUSCH, and a value of $f_{b,f,c}(i,l)$ corresponding to the first PUSCH.

In one embodiment, the first upper limit is measured by dBm, and the first power value is measured by dBm.

In one embodiment, the first upper limit is measured by watts or milliwatts, and the first power value is measured by watts or milliwatts.

In one embodiment, a unit of the first upper limit value, a unit of the first power value, and transmission power of the first PUSCH are all the same.

In one embodiment, the technical feature that "the target power value is equal to a smaller value compared between a first upper limit value or a first power value" comprises the following meaning: when the first upper limit value is greater than the first power value, the target power value is equal to the first power value; when the first upper limit value is less than the first power value, the target power value is equal to the first upper limit value; when the first upper limit value is equal to the first power value, the target power value is equal to the first upper limit value or the first power value.

In one embodiment, the technical feature that "the target power value is equal to a smaller value compared between a first upper limit value or a first power value" comprises the following meaning: the target power value is equal to a result of taking a smaller value (min) between the first upper limit value and the first power value.

In one embodiment, the first parameter value is a value of maximum power reduction (MPR).

In one embodiment, the first parameter value is a value of additional maximum power reduction (A-MPR).

In one embodiment, the first parameter value is a value of power management maximum power reduction (P-MPR).

In one embodiment, the first parameter value is a value of a parameter other than MPR, A-MPR, or P-MPR.

In one embodiment, the technical feature that "a first parameter value is used to determine the first upper limit value" comprises the following meaning: the first parameter value is used by the first node in the present application for determining the first upper limit value.

In one embodiment, the technical feature that "a first parameter value is used to determine the first upper limit value" comprises the following meaning: the first parameter value is used to determine a value interval (or range) to which the first upper limit value belongs.

In one embodiment, the technical feature that "a first parameter value is used to determine the first upper limit value" comprises the following meaning: the first parameter value is used to determine a lower boundary of a value interval (or range) to which the first upper limit value belongs.

In one embodiment, the technical feature that "a first parameter value is used to determine the first upper limit value" comprises the following meaning: the first parameter value is used to determine a lower bound value of the first upper limit value.

In one embodiment, the technical feature that "a first parameter value is used to determine the first upper limit value" comprises the following meaning: the first parameter value is used to determine a value interval (or value range) to which the first upper limit value belongs, and a transmitter of the first PUSCH is allowed to set the first upper limit value within a value interval (or value range) to which the first upper limit value belongs.

In one embodiment, the technical feature that "a first parameter value is used to determine the first upper limit value" comprises the following meaning: the first parameter value is used to calculate a lower boundary of a value interval (or range) to which the first upper limit value belongs.

In one embodiment, the technical feature that "a first parameter value is used to determine the first upper limit value" comprises the following meaning: a lower bound value of the first upper limit value is related to the first parameter value.

In one embodiment, the technical feature that "a first parameter value is used to determine the first upper limit value" is implemented by satisfying the following formula:

$$P_{CMAX\_L,f,c}=\text{MIN}\{P_{EMAX,c}-\Delta T_{C,c},(P_{PowerClass}-\Delta P_{PowerClass})-\text{MAX}(\text{MAX}(\text{MPR}_c+\Delta\text{MPR}_c,\text{A-MPR}_c)+\Delta T_{IB,c}+\Delta T_{C,c},\text{P-MPR}_c)\}$$

herein, $P_{CMAX\_L,f,c}$ represents a lower bound value of the first upper limit value, $P_{EMAX,c}$ represents a configured value, $\Delta T_{C,c}$ represents an offset value of a tolerance lower limit, $P_{PowerClass}$ represents a power level of a transmitter of the first PUSCH, $\Delta P_{PowerClass}$ represents an offset value of a power level of a transmitter of the first PUSCH, $\Delta T_{IB,c}$ represents an additional tolerance value, $MPR_c$ represents the first parameter value or A-$MPR_c$ represents the first parameter value or P-$MPR_c$ represents the first parameter value, $\Delta MPR_c$ represents an offset value related to transmission bandwidth.

In one embodiment, "the first parameter value is related to the target waveform" comprises the following meaning: the target waveform is used to determine the first parameter value.

In one embodiment, "the first parameter value is related to the target waveform" comprises the following meaning: the target waveform is used to determine the first parameter value based on a predefined mapping relation or corresponding relation.

In one embodiment, "the first parameter value is related to the target waveform" comprises the following meaning: the target waveform is used to determine the first parameter value based on a predefined table relation.

In one embodiment, "the first parameter value is related to the target waveform" comprises the following meaning: the target waveform is used to determine the first parameter value based on a predefined functional relation.

In one embodiment, "the first parameter value is related to the target waveform" comprises the following meaning: the target waveform and a modulation and coding scheme (MCS) adopted by the first PUSCH are used together to determine the first parameter value based on a predefined table relation.

In one embodiment, "the first parameter value is related to the target waveform" comprises the following meaning: the target waveform, an MCS adopted by the first PUSCH, and a position of frequency-domain resources occupied by the first PUSCH are used together to determine the first parameter value based on a predefined table relation.

In one embodiment, "the first parameter value is related to the target waveform" comprises the following meaning: the target waveform and at least one of power of a transmitter of the first PUSCH, carrier frequency of the first PUSCH, receiving device type of the first PUSCH, a number of frequency-domain resources occupied by the first PUSCH, a subcarrier spacing (SCS) of a subcarrier occupied by the first PUSCH, a frequency-domain position of frequency-domain resources occupied by the first PUSCH, or an MCS adopted by the first PUSCH is used to determine the first parameter value.

In one embodiment, "the first parameter value is related to the target waveform" comprises the following meaning: the X1 candidate waveforms respectively correspond to X1 parameter value sets, and any of the X1 parameter value sets comprises at least one parameter value, the first parameter value is a parameter comprised in one of the X1 parameter value sets; the first parameter value is a parameter value comprised in a parameter value set corresponding to the target waveform.

In one embodiment, the second parameter value is a parameter in power control of the first PUSCH.

In one embodiment, the second parameter value is a parameter in open-loop power control of the first PUSCH.

In one embodiment, the second parameter value is a parameter in close-loop power control of the first PUSCH.

In one embodiment, the second parameter value is a value of $P_{O\_PUSCH,b,f,c}(j)$ corresponding to the first PUSCH.

In one embodiment, the second parameter value is a value of $\alpha_{b,f,c}(j) \cdot PL_{b,f,c}(q_d)$ corresponding to the first PUSCH.

In one embodiment, the second parameter value is a value of $\Delta_{TF,b,f,c}(i)$ corresponding to the first PUSCH.

In one embodiment, the second parameter value is a value of $f_{b,f,c}(i, 1)$ corresponding to the first PUSCH.

In one embodiment, the second parameter value is a value of $$2^\mu \cdot M_{RB,b,f,c}^{PUSCH}(i)$$

corresponding to the first PUSCH.

In one embodiment, the second parameter value is a value of a parameter other than $P_{O\_PUSCH,b,f,c}(j)$ corresponding to the first PUSCH, $\Delta_{TF,b,f,c}(i)$ corresponding to the first PUSCH, $f_{b,f,c}(i, 1)$ corresponding to the first PUSCH, or $$2^\mu \cdot M_{RB,b,f,c}^{PUSCH}(i)$$

corresponding to the first PUSCH.

In one embodiment, the technical feature that "a second parameter value is used to determine the first power value" comprises the following meaning: the second parameter value is used by the first node in the present application for determining the first power value.

In one embodiment, the technical feature that "a second parameter value is used to determine the first power value" comprises the following meaning: the second parameter value is used to calculate the first power value.

In one embodiment, the technical feature that "a second parameter value is used to determine the first power value" comprises the following meaning: the first power value and the second parameter value are linearly correlated.

In one embodiment, the technical feature that "a second parameter value is used to determine the first power value" comprises the following meaning: the first power value and logarithmic values of the second parameter value are linearly correlated.

In one embodiment, the technical feature that "a second parameter value is used to determine the first power value" comprises the following meaning: the second parameter value is used to determine the first power value based on a mapping relation or corresponding relation.

In one embodiment, the technical feature that "a second parameter value is used to determine the first power value" comprises the following meaning: the first power value is equal to $$P_{O\_PUSCH,b,fc}(j) +$$

$$10\log_{10}\left(2^\mu \cdot M_{RB,b,f,c}^{PUSCH}(i)\right) + \alpha_{b,f,c}(j) \cdot PL_{b,f,c}(q_d) + \Delta_{TF,b,f,c}(i) + f_{b,f,c}(i, l),$$

where a value of one of $P_{O\_PUSCH,b,fc}(j)$, $$2^\mu \cdot M_{RB,b,fc}^{PUSCH}(i), \Delta_{TF,b,f,c}(i) \text{ or } f_{b,fc}(i, l)$$

is equal to the second parameter value.

In one embodiment, the technical feature that "a second parameter value is used to determine the first power value" comprises the following meaning: the first power value is equal to $$P_{O\_PUSCH,b,fc}(j) + 10\log_{10}\left(2^{\mu} \cdot M_{RB,b,f,c}^{PUSCH}(i)\right) +$$

$$\alpha_{b,f,c}(j) \cdot PL_{b,f,c}(q_d) + \Delta_{TF,b,f,c}(i) + f_{b,f,c}(i, l) + \vartheta,$$

where a value of ϑ is equal to the second parameter value.

In one embodiment, the technical feature that "the second parameter value is related to a value of the second field comprised in the first DCI format and the target waveform" comprises the following meaning: a value of the second field comprised in the first DCI format and the target waveform are used together to determine the second parameter value.

In one embodiment, the technical feature that "the second parameter value is related to a value of the second field comprised in the first DCI format and the target waveform" comprises the following meaning: a value of the second field comprised in the first DCI format and the target waveform are used together to determine the second parameter value based on a predefined mapping relation or a corresponding relation or a conditional relation.

In one embodiment, the technical feature that "the second parameter value is related to a value of the second field comprised in the first DCI format and the target waveform" comprises the following meaning: values of the second field comprised in different waveforms or different first DCI formats correspond to different candidate values of the second parameter values based on a predefined mapping relation or a corresponding relation or a conditional relation, and the second parameter value is a candidate value corresponding to the target waveform and a value of the second field comprised in the first DCI format.

In one embodiment, the technical feature that "the second parameter value is related to a value of the second field comprised in the first DCI format and the target waveform" comprises the following meaning: the target waveform and a value of the second field comprised in the first DCI format are used to determine the second parameter value based on a predefined table relation or a functional relation.

In one embodiment, the technical feature that "the second parameter value is related to a value of the second field comprised in the first DCI format and the target waveform" comprises the following meaning: a value of the second field comprised in the first DCI format and the target waveform are used together to determine a power adjustment state corresponding to the first PUSCH, and a power control adjustment state corresponding to the first PUSCH is used to determine the second parameter value.

In one embodiment, the technical feature that "the second parameter value is related to both a value of the second field comprised in the first DCI format and the target waveform" comprises the following meaning: a value of the second field comprised in the first DCI format is used to determine a value of an SRS resource indicator (SRI), and a value of an SRI determined by a value of the second field comprised in the first DCI format as well as the target waveform are used together to determine a power control adjustment state corresponding to the first PUSCH, and a power control adjustment state corresponding to the first PUSCH is used to determine the second parameter value.

In one embodiment, the technical feature that "the second parameter value is related to a value of the second field comprised in the first DCI format and the target waveform" comprises the following meaning: a value of the second field comprised in the first DCI format and the target waveform are used together to determine a close-loop power control index corresponding to the first PUSCH, and the close-loop power control index corresponding to the first PUSCH is used to determine the second parameter value.

In one embodiment, the technical feature that "the second parameter value is related to a value of the second field comprised in the first DCI format and the target waveform" comprises the following meaning: the second parameter value is a value of $P_{O\_PUSCH,b,f,c}(j)$ corresponding to the first PUSCH, and a value of parameter j in $P_{O\_PUSCH,b,f,c}(j)$ corresponding to the first PUSCH is related to both a value of the second field comprised in the first DCI format and the target waveform.

In one embodiment, the technical feature that "the second parameter value is related to a value of the second field comprised in the first DCI format and the target waveform" comprises the following meaning: the second parameter value is a value of $f_{b,f,c}(i, l)$ corresponding to the first PUSCH, and a value of parameter l in $f_{b,f,c}(i, l)$ corresponding to the first PUSCH is related to both a value of the second field comprised in the first DCI format and the target waveform.

In one embodiment, the technical feature that "the second parameter value is related to a value of the second field comprised in the first DCI format and the target waveform" comprises the following meaning: the second parameter value is a value of $\alpha_{b,f,c}(j)$ corresponding to the first PUSCH, and a value of parameter j in $\alpha_{b,f,c}(j)$ corresponding to the first PUSCH is related to both a value of the second field comprised in the first DCI format and the target waveform.

In one embodiment, the technical feature that "the second parameter value is related to a value of the second field comprised in the first DCI format and the target waveform" comprises the following meaning: a value of the second field comprised in the first DCI format is used to determine a bit per resource element (BPRE) value of the first PUSCH, and both the target waveform and the BPRE value of the first PUSCH are used to determine the second parameter value.

In one embodiment, a transmitter of the first PUSCH and the first node are equivalent or can be used interchangeably.

Embodiment 2

Figure 2:
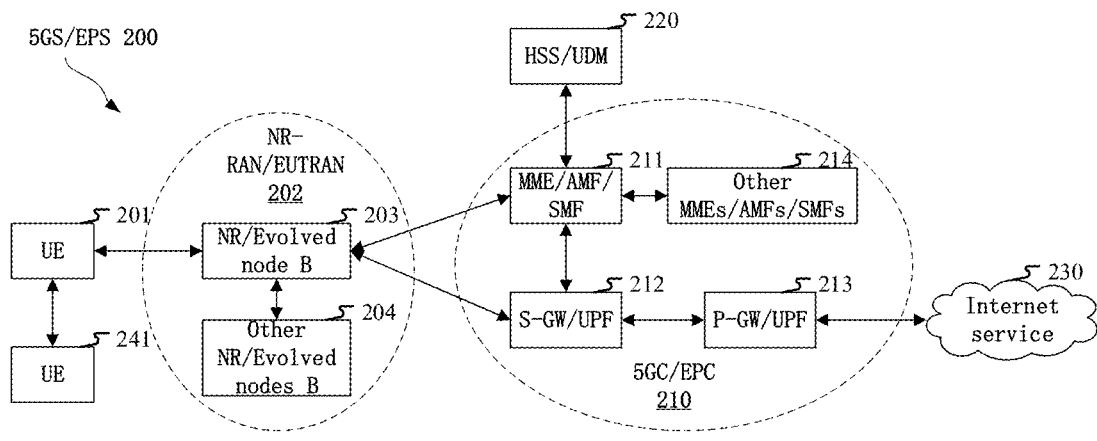
FIG. 2 illustrates a schematic diagram of a network architecture according to one embodiment of the present application.

Embodiment 2 illustrates a schematic diagram of a network architecture according to the present application, as shown in FIG. 2. FIG. 2 illustrates a network architecture 200 of 5G NR, Long-Term Evolution (LTE) and Long-Term Evolution Advanced (LTE-A) systems. The 5G NR or LTE network architecture 200 may be called a 5G System (5GS)/ Evolved Packet System (EPS) 200 or other appropriate terms. The 5GS/EPS 200 may comprise one or more UEs 201, an NG-RAN 202, a 5G Core Network/Evolved Packet Core (5GC/EPC) 210, a Home Subscriber Server (HSS)/ Unified Data Management (UDM) 220 and an Internet Service 230. The 5GS/EPS 200 may be interconnected with other access networks. For simple description, the entities/ interfaces are not shown. As shown in FIG. 2, the 5GS/EPS 200 provides packet switching services. Those skilled in the art will readily understand that various concepts presented throughout the present application can be extended to networks providing circuit switching services or other cellular networks. The NG-RAN comprises an NR/evolved node B (gNB/eNB) 203 and other gNBs (eNBs) 204. The gNB (eNB) 203 provides UE 201-oriented user plane and control plane protocol terminations. The gNB(eNB) 203 may be connected to other gNBs (eNBs) 204 via an Xn/X2 interface (e.g., backhaul). The gNB(eNB) 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB(eNB) 203 provides an access point of the 5GC/EPC 210 for the UE 201. Examples of the UE 201 include cellular phones, smart phones, Session Initiation Protocol (SIP) phones, laptop computers, Personal Digital Assistant (PDA), satellite Radios, non-terrestrial base station communications, Satellite Mobile Communications, Global Positioning Systems (GPS), multimedia devices, video devices, digital audio players (for example, MP3 players), cameras, game consoles, unmanned aerial vehicles (UAV), aircrafts, narrow-band Internet of Things (IoT) devices, machine-type communication devices, land vehicles, automobiles, wearable devices, or any other similar functional devices. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB(eNB) 203 is connected to the 5GC/EPC 210 via an S1/NG interface. The 5GC/EPC 210 comprises a Mobility Management Entity (MME)/Authentication Management Field (AMF)/Session Management Function (SMF) 211, other MMEs/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212, the S-GW/UPF 212 is connected to the P-GW/UPF 213. The P-GW provides UE IP address allocation and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching Streaming Services (PSS).

In one embodiment, the UE 201 corresponds to the first node in the present application.

In one embodiment, the gNB(eNB) 201 corresponds to the second node in the present application.

Embodiment 3

Figure 3:
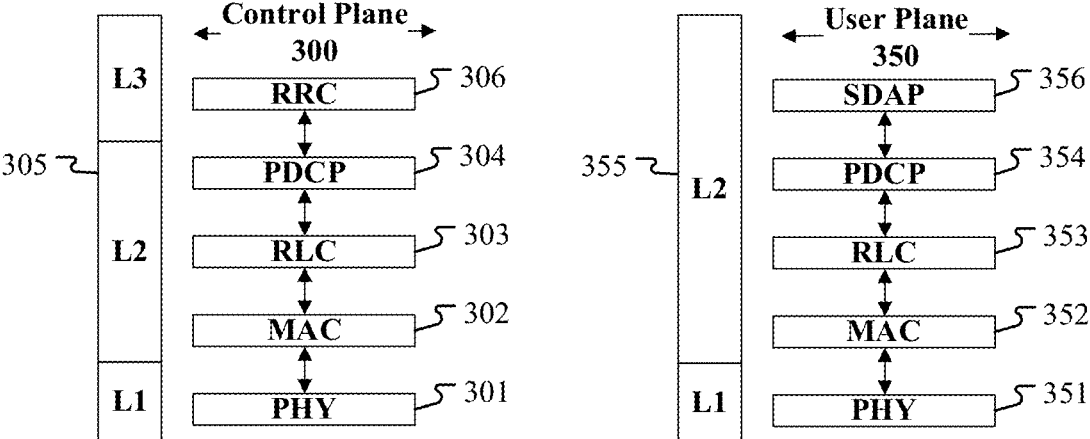
FIG. 3 illustrates a schematic diagram of a radio protocol architecture of a user plane and a control plane according to one embodiment of the present application.

Embodiment 3 illustrates a schematic diagram of an example of a radio protocol architecture of a user plane and a control plane according to one embodiment of the present application, as shown in FIG. 3. FIG. 3 is a schematic diagram illustrating an embodiment of a radio protocol architecture of a user plane 350 and a control plane 300. In FIG. 3, the radio protocol architecture for a first node (UE or gNB) and a second node (gNB or UE) is represented by three layers, which are a layer 1, a layer 2 and a layer 3, respectively. The layer 1 (L1) is the lowest layer and performs signal processing functions of various PHY layers. The L1 is called PHY 301 in the present application. The layer 2 (L2) 305 is above the PHY 301, and is in charge of the link between the first node and the second node via the PHY 301. L2 305 comprises a Medium Access Control (MAC) sublayer 302, a Radio Link Control (RLC) sublayer 303 and a Packet Data Convergence Protocol (PDCP) sublayer 304. All the three sublayers terminate at the second node. The PDCP sublayer 304 provides multiplexing among variable radio bearers and logical channels. The PDCP sublayer 304 provides security by encrypting a packet and provides support for a first node handover between second nodes. The RLC sublayer 303 provides segmentation and reassembling of a higher-layer packet, retransmission of a lost packet, and reordering of a data packet so as to compensate the disordered receiving caused by HARQ. The MAC sublayer 302 provides multiplexing between a logical channel and a transport channel. The MAC sublayer 302 is also responsible for allocating between first nodes various radio resources (i.e., resource block) in a cell. The MAC sublayer 302 is also in charge of HARQ operation. The Radio Resource Control (RRC) sublayer 306 in layer 3(L3) of the control plane 300 is responsible for acquiring radio resources (i.e., radio bearer) and configuring the lower layer with an RRC signaling between a second node and a first node. The radio protocol architecture of the user plane 350 comprises layer 1 (L1) and layer 2 (L2). In the user plane 350, the radio protocol architecture for the first node and the second node is almost the same as the corresponding layer and sublayer in the control plane 300 for physical layer 351, PDCP sublayer 354, RLC sublayer 353 and MAC sublayer 352 in L2 layer 355, but the PDCP sublayer 354 also provides a header compression for a higher-layer packet so as to reduce a radio transmission overhead. The L2 layer 355 in the user plane 350 also includes Service Data Adaptation Protocol (SDAP) sublayer 356, which is responsible for the mapping between QoS flow and Data Radio Bearer (DRB) to support the diversity of traffic. Although not described in FIG. 3, the first node may comprise several higher layers above the L2 layer 355, such as a network layer (e.g., IP layer) terminated at a P-GW of the network side and an application layer terminated at the other side of the connection (e.g., a peer UE, a server, etc.).

In one embodiment, the radio protocol architecture in FIG. 3 is applicable to the first node in the present application.

In one embodiment, the radio protocol architecture in FIG. 3 is applicable to the second node in the present application.

Embodiment 4

Figure 4:
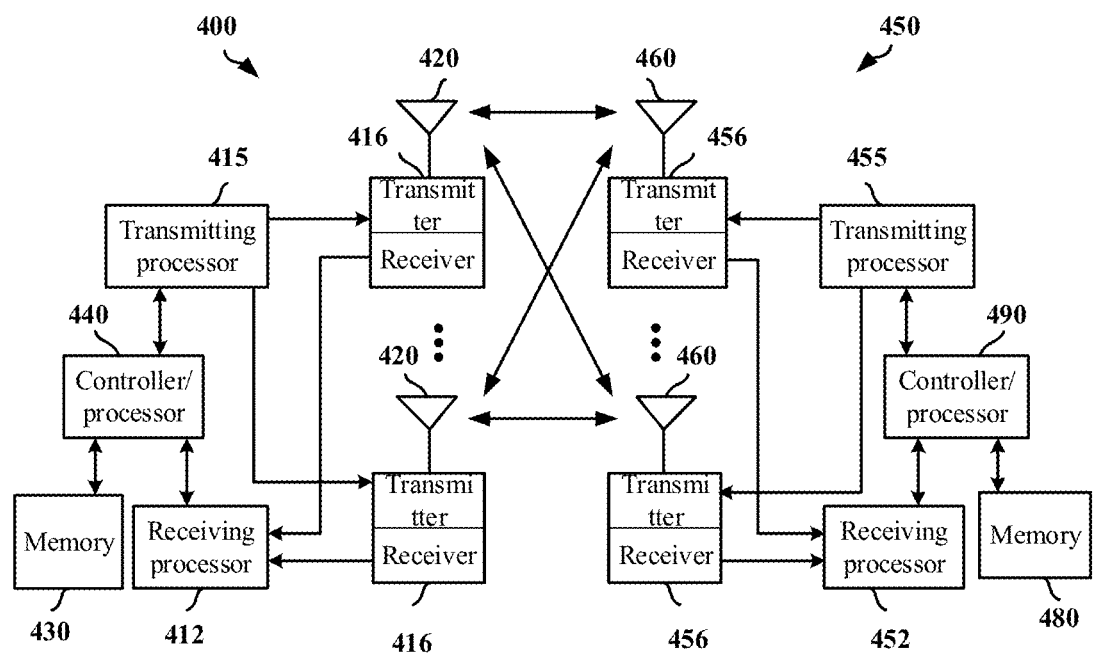
FIG. 4 illustrates a schematic diagram of a first node and a second node according to one embodiment of the present application.

Embodiment 4 illustrates a schematic diagram of a first node and a second node according to one embodiment of the present application, as shown in FIG. 4.

The first node (450) may comprise a controller/processor 490, a data source/buffer 480, a receiving processor 452, a transmitter/receiver 456 and a transmitting processor 455, wherein the transmitter/receiver 456 comprises an antenna 460.

The second node (410) may comprise a controller/processor 440, a data source/buffer 430, a receiving processor 412, a transmitter/receiver 416 and a transmitting processor 415, wherein the transmitter/receiver 416 comprises an antenna 420.

In downlink (DL), a higher-layer packet, such as higher-layer information comprised in a first information block and a second information block in the present application, is provided to the controller/processor 440. The controller/processor 440 implements the functionality of the L2 layer and the higher layer. In DL transmission, the controller/processor 440 provides header compression, encryption, packet segmentation and reordering and multiplexing between a logical channel and a transport channel, as well as radio resource allocation for the first node 450 based on varied priorities. The controller/processor 440 is also in charge of HARQ operation, retransmission of a lost packet, and a signaling to the first node 450, for instance, higher-layer information comprised in the first information block and the second information block in the present application are all generated in the controller/processor 440. The transmitting processor 415 provides various signal-processing functions for the L1 layer (that is, PHY), including coding, interleaving, scrambling, modulation, power control/allocation, precoding and generation of physical-layer control signaling, such as the generation of a physical-layer signal carrying the first information block and the second information block in the present application and the generation of a physical-layer signal carrying the first DCI format are completed at the transmitter 415. The generated modulation symbols are divided into parallel streams and each stream is mapped onto a corresponding multicarrier subcarrier and/or a multicarrier symbol, which is later mapped from the transmitting processor 415 to the antenna 420 via the transmitter 416 in the form of a radio frequency signal. At the receiving side, each receiver 456 receives an RF signal via a corresponding antenna 460, each receiver 456 recovers baseband information modulated to the RF carrier and provides the baseband information to the receiving processor 452. The receiving processor 452 provides various signal receiving functions for the L1 layer. The signal receiving and processing functions include reception of a physical layer signal carrying the first information block and the second information block the present application and a physical-layer signal carrying the first DCI format, demodulation of multicarrier symbols in multicarrier symbol streams based on each modulation scheme (e.g., BPSK, QPSK), and then descrambling, decoding and de-interleaving of the demodulated symbols so as to recover data or control signals transmitted by the second node 410 on a physical channel, and the data or control signals are later provided to the controller/processor 490. The controller/processor 490 is in charge of the function of L2 layer and above layers, and the controller/processor 490 interprets higher-layer information comprised in the first information block and the second information block in the present application. The controller/processor can be connected to a memory 480 that stores program code and data. The memory 480 may be called a computer readable medium.

In uplink (UL) transmission, similar to downlink transmission, the higher-layer information comprises the higher-layer information comprised in the first PUSCH in the present application, which is generated by the controller/processor 490 and implemented by the transmission processor 455 for various signal transmission processing functions of the L1 layer (i.e., the physical layer), including the generation of the physical layer signal carrying the first PUSCH is completed by the transmission processor 455, which is then mapped to the antenna 460 by the transmitting processor 455 via the transmitter 456 to be transmitted in the form of an RF signal. The receiver 416 receives a radio-frequency signal via its corresponding antenna 420, and each receiver 416 recovers baseband information modulated to a radio-frequency carrier, and supplies the baseband information to the receiving processor 412. The receiving processor 412 implements various signal reception and processing functions for the L1 layer (i.e., the physical layer), including receiving and processing a physical layer signal carrying the first PUSCH, and then providing data and/or control signals to the controller/processor 440. The function of implementing L2 layer in controller/processor 440 comprises interpreting higher layer information, comprising an interpretation of higher-layer information carried by the first PUSCH (if the first PUSCH carries higher-layer information). The controller/processor can be connected to a buffer 430 that stores program code and data. The buffer 430 may be called a computer readable medium.

In one embodiment, the first node 450 comprises at least one processor and at least one memory. The at least one memory comprises computer program codes; the at least one memory and the computer program codes are configured to be used in collaboration with the at least one processor. The first node 450 at least: receives a first information block and receives a first DCI format, the first information block is used to determine the first DCI format; transmits a first PUSCH, a waveform adopted by the first PUSCH is a target waveform, the target waveform is one of X1 candidate waveforms, X1 being a positive integer greater than 1; herein, the first DCI format at least comprises a first field and a second field, and the first field and the second field are respectively two different fields; a value of the first field comprised in the first DCI format is used to determine the target waveform from the X1 candidate waveforms; a target power value is equal to a transmission power value of the first PUSCH, and the target power value is equal to a smaller value between a first upper limit value or a first power value; a first parameter value is used to determine the first upper limit value, and the first parameter value is related to the target waveform; a second parameter value is used to determine the first power value, the second parameter value is related to both a value of the second field comprised in the first DCI format and the target waveform.

In one embodiment, the first node 450 comprises a memory that stores a computer readable instruction program. The computer readable instruction program generates an action when executed by at least one processor. The action includes: receiving a first information block and receiving a first DCI format, the first information block being used to determine the first DCI format; transmitting a first PUSCH, a waveform adopted by the first PUSCH being a target waveform, the target waveform being one of X1 candidate waveforms, X1 being a positive integer greater than 1; herein, the first DCI format at least comprises a first field and a second field, and the first field and the second field are respectively two different fields; a value of the first field comprised in the first DCI format is used to determine the target waveform from the X1 candidate waveforms; a target power value is equal to a transmission power value of the first PUSCH, and the target power value is equal to a smaller value between a first upper limit value or a first power value; a first parameter value is used to determine the first upper limit value, and the first parameter value is related to the target waveform; a second parameter value is used to determine the first power value, the second parameter value is related to both a value of the second field comprised in the first DCI format and the target waveform.

In one embodiment, the second node 410 comprises at least one processor and at least one memory. The at least one memory comprises computer program codes; the at least one memory and the computer program codes are configured to be used in collaboration with the at least one processor. The second node 410 at least: transmits a first information block and transmits a first DCI format, the first information block is used to determine the first DCI format; receives a first PUSCH, a waveform adopted by the first PUSCH is a target waveform, the target waveform is one of X1 candidate waveforms, X1 being a positive integer greater than 1; herein, the first DCI format at least comprises a first field and a second field, and the first field and the second field are respectively two different fields; a value of the first field comprised in the first DCI format is used to determine the target waveform from the X1 candidate waveforms; a target power value is equal to a transmission power value of the first PUSCH, and the target power value is equal to a smaller value between a first upper limit value or a first power value; a first parameter value is used to determine the first upper limit value, and the first parameter value is related to the target waveform; a second parameter value is used to determine the first power value, the second parameter value is related to both a value of the second field comprised in the first DCI format and the target waveform.

In one embodiment, the second node 410 comprises a memory that stores a computer readable instruction program. The computer readable instruction program generates an action when executed by at least one processor. The action includes: transmitting a first information block and transmitting a first DCI format, the first information block being used to determine the first DCI format; receiving a first PUSCH, a waveform adopted by the first PUSCH being a target waveform, the target waveform being one of X1 candidate waveforms, X1 being a positive integer greater than 1; herein, the first DCI format at least comprises a first field and a second field, and the first field and the second field are respectively two different fields; a value of the first field comprised in the first DCI format is used to determine the target waveform from the X1 candidate waveforms; a target power value is equal to a transmission power value of the first PUSCH, and the target power value is equal to a smaller value between a first upper limit value or a first power value; a first parameter value is used to determine the first upper limit value, and the first parameter value is related to the target waveform; a second parameter value is used to determine the first power value, the second parameter value is related to both a value of the second field comprised in the first DCI format and the target waveform.

In one embodiment, the first node 450 is a UE.

In one embodiment, the second node 410 is a base station (gNB/eNB).

In one embodiment, the receiver 456 (including the antenna 460), the receiving processor 452 and the controller/processor 490 are used to receive the first information block in the present application.

In one embodiment, the receiver 456 (including the antenna 460) and the receiving processor 452 are used to receive a first DCI format in the present application.

In one embodiment, the transmitter 456 (including the antenna 460), the transmitting processor 455 and the controller/processor 490 are used to transmit the first PUSCH in the present application.

In one embodiment, the receiver 456 (including the antenna 460), the receiving processor 452 and the controller/processor 490 are used to receive the second information block in the present application.

In one embodiment, the transmitter 416 (including the antenna 420), the transmitting processor 415 and the controller/processor 440 are used to transmit the first information block in the present application.

In one embodiment, the transmitter 416 (including the antenna 420) and the transmitting processor 415 are used to transmit the first DCI format in the present application.

In one embodiment, the receiver 416 (including the antenna 420), the receiving processor 412 and the controller/processor 440 are used to receive the first PUSCH in the present application.

In one embodiment, the transmitter 416 (including the antenna 420), the transmitting processor 415 and the controller/processor 440 are used to transmit the second information block in the present application.

Embodiment 5

Figure 5:
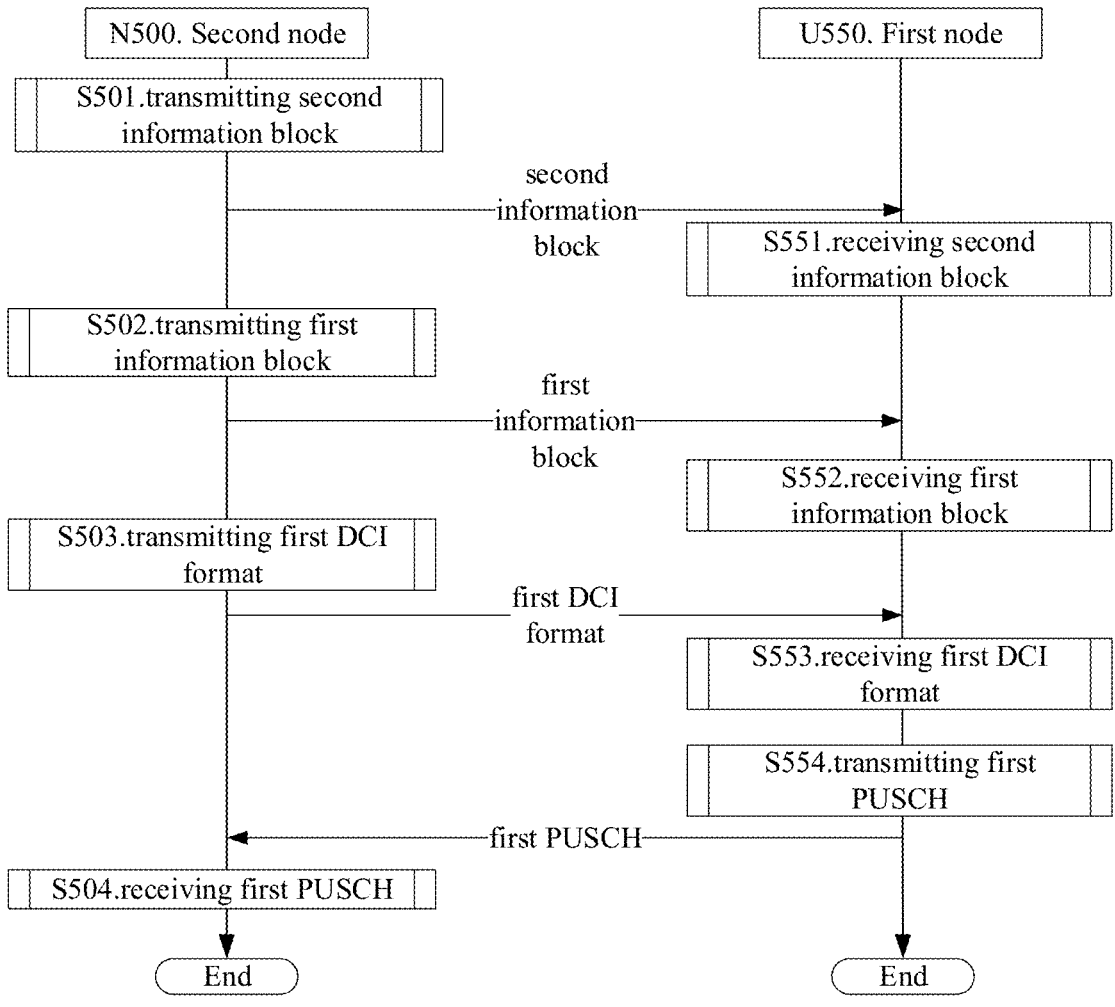
FIG. 5 illustrates a flowchart of radio signal transmission according to one embodiment of the present application.

Embodiment 5 illustrates a flowchart of radio signal transmission according to one embodiment in the present application, as shown in FIG. 5. In FIG. 5, a second node N500 is a maintenance base station of a serving cell of a first node U550. It is particularly underlined that the order illustrated in the embodiment does not put constraints over sequences of signal transmissions and implementations.

The second node N500 transmits a second information block in step S501, transmits a first information block in step S502, transmits a first DCI format in step S503, and receives a first PUSCH in step S504.

The first node U550 receives a second information block in step S551, receives a first information block in step S552, receives a first DCI format in step S553, and transmits a first PUSCH in step S554.

In embodiment 5, the first information block is used to determine the first DCI format; a waveform adopted by the first PUSCH is a target waveform, the target waveform is one of X1 candidate waveforms, X1 being a positive integer greater than 1; herein, the first DCI format at least comprises a first field and a second field, and the first field and the second field are respectively two different fields; a value of the first field comprised in the first DCI format is used to determine the target waveform from the X1 candidate waveforms; a target power value is equal to a transmission power value of the first PUSCH, and the target power value is equal to a smaller value between a first upper limit value or a first power value; a first parameter value is used to determine the first upper limit value, and the first parameter value is related to the target waveform; a second parameter value is used to determine the first power value, the second parameter value is related to both a value of the second field comprised in the first DCI format and the target waveform; the second information block is used to determine a reference waveform, and the reference waveform is one of the X1 candidate waveforms; the reference waveform is a default waveform adopted for an uplink transmission when the first field is absent. In one embodiment, the first information block is before the second information block.

In one embodiment, the first information block is after the second information block.

In one embodiment, the first information block and the second information block belong to a same IE.

In one embodiment, the first information block and the second information block respectively belong to two different IEs.

In one embodiment, the first information block and the second information block are transmitted through a same Physical Downlink Shared Channel (PDSCH).

In one embodiment, the second information is transmitted via an air interface or a radio interface.

In one embodiment, the second information block comprises all or part of a higher-layer signaling or physical-layer signaling.

In one embodiment, the second information block comprises all or part of a Radio Resource Control (RRC) layer signaling, or the second information block comprises all or part of a Medium Access Control (MAC) layer signaling.

In one embodiment, the second information block comprises all or part of a System Information Block (SIB).

In one embodiment, the second information block is UE-specific.

In one embodiment, the second information block is per-carrier configured, or the second information block is per-bandwidth part (BEP) configured, or the second information block is per-band or per-FR configured.

In one embodiment, the second information block comprises all or partial fields in a Downlink Control Information (DCI) format.

In one embodiment, the second information block comprises all or part in an IE "PUSCH-Config"; or the second information block comprises all or part in an IE "BWP-UplinkDedicated"; or the second information block comprises all or part in an IE "BWP-Uplink"; or the second information block comprises all or part in an IE "ServingCellConfig"; or the second information block comprises all or part in an IE "UplinkConfig".

In one embodiment, the second information block comprises all or part in an IE "ConfiguredGrantConfig".

In one embodiment, the second information block comprises all or part in an IE "PTRS-UplinkConfig".

In one embodiment, the second information block comprises all or part in an IE "PUSCH-Config Common".

In one embodiment, the second information block comprises a higher-layer parameter "msg3-transformPrecoder" or "msgA-TransformPrecoder".

In one embodiment, the second information block comprises a higher-layer parameter "transformPrecoder".

In one embodiment, the technical feature that "the second information block is used to determine a reference waveform" comprises the following meaning: the second information block is used by the first node in the present application to determine the reference waveform.

In one embodiment, the technical feature that "the second information block is used to determine a reference waveform" comprises the following meaning: all or part comprised in the second information block is used to explicitly or implicitly indicate the reference waveform from the X1 candidate waveforms.

In one embodiment, the technical feature that "the second information block is used to determine a reference waveform" comprises the following meaning: the second information block is used to explicitly or implicitly indicate whether the reference waveform adopts transform precoding (transform precoder).

In one embodiment, the technical feature that "the second information block is used to determine a reference waveform" comprises the following meaning: the second information block is used to explicitly or implicitly indicate whether the transform precoding (transform precoder) corresponding to the reference waveform is on or off.

In one embodiment, the technical feature that "the second information block is used to determine a reference waveform" comprises the following meaning: the second information block is used to explicitly or implicitly indicate whether the transform precoding (transform precoder) for uplink transmission is on or off.

In one embodiment, the technical feature that "the second information block is used to determine a reference waveform" comprises the following meaning: the second information block is used to explicitly or implicitly indicate whether the transform precoding (transform precoder) of a PUSCH is on or off.

In one embodiment, the technical feature that "the second information block is used to determine a reference waveform" comprises the following meaning: when a parameter in the second information block is equal to a value or state, the reference waveform is an OFDM with transform precoding (transform precoder) enabled; when a same parameter in the second information block is equal to another value or state, the reference waveform is an OFDM with transform precoding (transform precoder) disabled.

Embodiment 6

Figures 6, 7, 8, 9:
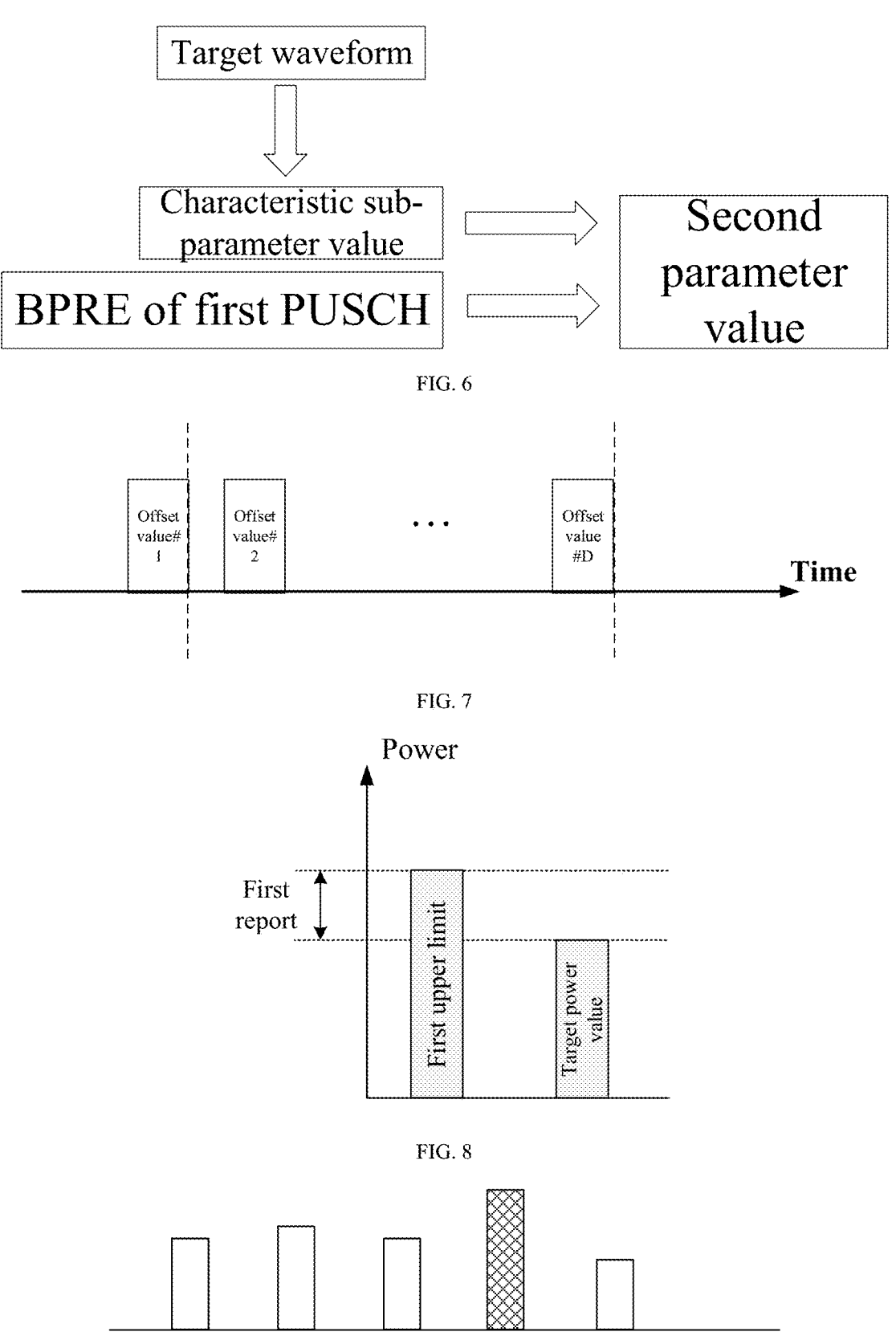
FIG. 6 illustrates a schematic diagram of a second parameter value according to one embodiment of the present application.
FIG. 7 illustrates a schematic diagram of a first offset value set according to one embodiment of the present application.
FIG. 8 illustrates a schematic diagram of a first report according to one embodiment of the present application.
FIG. 9 illustrates a schematic diagram of a target size according to one embodiment of the present application.

Embodiment 6 illustrates a schematic diagram of a second parameter value according to one embodiment of the present application, as shown in FIG. 6. In FIG. 6, a target waveform is used to determine a characteristic sub-parameter value, and the characteristic sub-parameter value and a BPRE of a first PUSCH are used to determine a second parameter value.

In embodiment 6, a value of the second field comprised in the first DCI format in the present application is used to determine a BPRE value of the first PUSCH in the present application, the first power value in the present application is linearly correlated to the second parameter value in the present application, and the unit of the first power value is dBm; a characteristic sub-parameter value and a BPRE value of the first PUSCH are both used to determine the second parameter value; the characteristic sub-parameter value belongs to a first sub-parameter value set, the first sub-parameter value set comprises at least one sub-parameter value, and the first sub-parameter value set is predefined or configured; the target waveform is used to determine the characteristic sub-parameter value from the first sub-parameter value set.

In one embodiment, by combining a target waveform with BPRE, power control design is simplified while an association between waveform and BPRE is considered, which effectively improves the uplink performance.

In one embodiment, a BPRE value of the first PUSCH is equal to a number of pre-encoded bit(s) mapped on each RE occupied by the first PUSCH.

In one embodiment, a BPRE value of the first PUSCH is equal to a number of bit(s) in at least one code block mapped on each RE occupied by the first PUSCH.

In one embodiment, a BPRE value of the first PUSCH is equal to a number of CSI bit(s) mapped on each RE occupied by the first PUSCH.

In one embodiment, a BPRE value of the first PUSCH is equal to a number of information bit(s) in part 1 CSI mapped on each RE occupied by the first PUSCH.

In one embodiment, the technical feature that "a value of the second field comprised in the first DCI format is used to determine a BPRE value of the first PUSCH" comprises the following meaning: a value of the second field comprised in the first DCI format is used by the first node in the present application to determine a BPRE value of the first PUSCH.

In one embodiment, the technical feature that "a value of the second field comprised in the first DCI format is used to determine a BPRE value of the first PUSCH" comprises the following meaning: a value of the second field comprised in the first DCI format is used to explicitly or implicitly indicate a BPRE value of the first PUSCH.

In one embodiment, the technical feature that "a value of the second field comprised in the first DCI format is used to determine a BPRE value of the first PUSCH" comprises the following meaning: a value of the second field comprised in the first DCI format is used to calculate a BPRE value of the first PUSCH.

In one embodiment, the technical feature that "a value of the second field comprised in the first DCI format is used to determine a BPRE value of the first PUSCH" comprises the following meaning: a value of the second field comprised in the first DCI format is used to determine an MCS adopted in the first PUSCH, and the MCS adopted in the first PUSCH is used to calculate a BPRE value of the first PUSCH.

In one embodiment, the technical feature that "a value of the second field comprised in the first DCI format is used to determine a BPRE value of the first PUSCH" comprises the following meaning: a value of the second field comprised in the first DCI format is used to determine a number of RE(s) occupied by the first PUSCH, and the number of RE(s) occupied by the first PUSCH is used to calculate a BPRE value of the first PUSCH.

In one embodiment, the technical feature that "a value of the second field comprised in the first DCI format is used to determine a BPRE value of the first PUSCH" comprises the following meaning: a value of the second field comprised in the first DCI format is used to determine whether the first PUSCH carries a UL-SCH, and a BPRE value of the first PUSCH is related to whether the first PUSCH carries a UL-SCH.

In one embodiment, the technical feature that "a value of the second field comprised in the first DCI format is used to determine a BPRE value of the first PUSCH" comprises the following meaning: a value of the second field comprised in the first DCI format is used to determine a β offset value of a CSI carried by the first PUSCH, and the β offset value of the CSI carried by the first PUSCH is used to calculate a BPRE value of the first PUSCH.

In one embodiment, the technical feature that "a value of the second field comprised in the first DCI format is used to determine a BPRE value of the first PUSCH" is implemented through the following formula:

$$BPRE = \sum_{r=0}^{C-1} K_r/N_{RE}$$

herein, C represents a number of code block(s) carried by the first PUSCH, $K_r$ represents a size of an r-th code block, $N_{RE}$ represents a number of RE(s) occupied by the first PUSCH excluding a demodulation reference signal (DMRS) and a phase tracking reference signal (PTRS), and a value of the second field comprised in the first DCI format is used to determine $N_{RE}$.

In one embodiment, the technical feature that "a value of the second field comprised in the first DCI format is used to determine a BPRE value of the first PUSCH" is implemented through the following formula:

$$BPRE = Q_m \cdot R/\beta_{offset}^{PUSCH}$$

herein, $Q_m$ represents a modulation order adopted by the first PUSCH, R represents a target code-rate, $$\beta_{offset}^{PUSCH}$$

represents β offset value of a CSI carried by the first PUSCH, a value of the second field comprised in the first DCI format is used to determine $Q_m$ or a value of the second field comprised in the first DCI format is used to determine $$\beta_{offset}^{PUSCH}.$$

In one embodiment, the technical feature that "a value of the second field comprised in the first DCI format is used to determine a BPRE value of the first PUSCH" comprises the following meaning: a value of the second field comprised in the first DCI format is used to determine whether the first PUSCH carries a UL-SCH; when the first PUSCH carries a UL-SCH, a BPRE value of the first PUSCH satisfies:

$$BPRE = \sum_{r=0}^{C-1} K_r/N_{RE};$$

when the first PUSCH does not carry a UL-SCH, a BPRE value of the first PUSCH satisfies:

$$BPRE = Q_m \cdot R/\beta_{offset}^{PUSCH};$$

herein, C represents a number of code block(s) carried by the first PUSCH, $K_r$ represents a size of an r-th code block, $N_{RE}$ represents a number of RE(s) occupied by the first PUSCH excluding a DMRS and a PTRS, $Q_m$ represents a modulation order adopted by the first PUSCH, R represents a target code rate, $$\beta_{offset}^{PUSCH}$$

represents a β offset value of a CSI carried by the first PUSCH.

In one embodiment, a number of code block(s) (CB(s)) carried by the first PUSCH and a size of carried code block(s) are also used to determine a BPRE value of the first PUSCH.

In one embodiment, a target code rate of a CSI carried by the first PUSCH is also used to determine a BPRE value of the first PUSCH.

In one embodiment, the first power value and the second parameter value are linearly and positively correlated.

In one embodiment, the first power value and the second parameter value are linearly and negatively correlated.

In one embodiment, a correlation coefficient between the first power value and the second parameter value is equal to 1.

In one embodiment, a correlation coefficient between the first power value and the second parameter value is equal to 10.

In one embodiment, the characteristic sub-parameter value is greater than 0.

In one embodiment, the characteristic sub-parameter value is equal to 1.

In one embodiment, the characteristic sub-parameter value is equal to 0.

In one embodiment, the characteristic sub-parameter value is less than 1.

In one embodiment, the characteristic sub-parameter value is greater than 1.

In one embodiment, the characteristic sub-parameter value is equal to a value of $K_s$ in power control.

In one embodiment, the characteristic sub-parameter value is equal to a value of a parameter other than $K_s$ in power control.

In one embodiment, the characteristic sub-parameter value is equal to a value of a parameter other than $K_s$ in power control and independent from $K_s$.

In one embodiment, the technical feature that "a characteristic sub-parameter value and a BPRE value of the first PUSCH are both used to determine the second parameter value" comprises the following meaning: the characteristic sub-parameter value and a BPRE value of the first PUSCH are both used by the first node in the present application to determine the second parameter value.

In one embodiment, the technical feature that "a characteristic sub-parameter value and a BPRE value of the first PUSCH are both used to determine the second parameter value" comprises the following meaning: the characteristic sub-parameter value and a BPRE value of the first PUSCH are both used to calculate the second parameter value.

In one embodiment, the technical feature that "a characteristic sub-parameter value and a BPRE value of the first PUSCH are both used to determine the second parameter value" comprises the following meaning: the characteristic sub-parameter value and a BPRE value of the first PUSCH are both used to calculate the second parameter value according to operational formula.

In one embodiment, the technical feature that "a characteristic sub-parameter value and a BPRE value of the first PUSCH are both used to determine the second parameter value" comprises the following meaning: a product of the characteristic sub-parameter value and a BPRE value of the first PUSCH are both used to calculate the second parameter value.

In one embodiment, the technical feature that "a characteristic sub-parameter value and a BPRE value of the first PUSCH are both used to determine the second parameter value" comprises the following meaning: the second parameter value is linearly correlated with a logarithmic value of a product between the characteristic sub-parameter value and a BPRE value of the first PUSCH.

In one embodiment, the technical feature that "a characteristic sub-parameter value and a BPRE value of the first PUSCH are both used to determine the second parameter value" comprises the following meaning: the characteristic sub-parameter value and a BPRE value of the first PUSCH are both used to determine a first intermediate value, and the second parameter value is linearly correlated with the first intermediate value.

In one embodiment, the technical feature that "a characteristic sub-parameter value and a BPRE value of the first PUSCH are both used to determine the second parameter value" comprises the following meaning: the characteristic sub-parameter value and a BPRE value of the first PUSCH are both used to determine a first intermediate value, and the second parameter value is linearly correlated with a logarithmic value of the first intermediate value.

In one embodiment, the technical feature that "a characteristic sub-parameter value and a BPRE value of the first PUSCH are both used to determine the second parameter value" comprises the following meaning: the characteristic sub-parameter value and a BPRE value of the first PUSCH, as well as a predefined or configured $\beta$ offset value are used together to calculate the second parameter value.

In one embodiment, the technical feature that "a characteristic sub-parameter value and a BPRE value of the first PUSCH are both used to determine the second parameter value" comprises the following meaning: the second parameter value $\Delta_{TF,b,f,c}(i)$ satisfies:

$$\Delta_{TF,f,c}(i) = 10\log_{10}\left(\left(2^{BPRE \cdot K_s} - 1\right) \cdot \beta_{offset}^{PUSCH}\right)$$

herein, $K_s$ represents the characteristic sub-parameter value, and $$\beta_{offset}^{PUSCH}$$

is equal to a predefined or configured $\beta$ offset value.

In one embodiment, the technical feature that "a characteristic sub-parameter value and a BPRE value of the first PUSCH are both used to determine the second parameter value" comprises the following meaning: the second parameter value $\Delta_{TF,b,f,c}(i)$ satisfies:

$$\Delta_{TF,f,c}(i) = 10\log_{10}\left(\left(2^{BPRE \cdot K_s \cdot K_w} - 1\right) \cdot \beta_{offset}^{PUSCH}\right)$$

herein, $K_s$ is a configured parameter, $K_w$ represents the characteristic sub-parameter value, and $$\beta_{offset}^{PUSCH}$$

is equal to a predefined or configured $\beta$ offset value.

In one embodiment, the technical feature that "a characteristic sub-parameter value and a BPRE value of the first PUSCH are both used to determine the second parameter value" comprises the following meaning: the second parameter value $\Delta_{TF,b,f,c}(i)$ satisfies:

$$\Delta_{TF,f,c}(i) = 10\log_{10}\left(K_W \cdot \left(2^{BPRE \cdot K_s} - 1\right) \cdot \beta_{offset}^{PUSCH}\right)$$

herein, $K_s$ is a configured parameter, $K_w$ represents the characteristic sub-parameter value, and $$\beta_{offset}^{PUSCH}$$

is equal to a predefined or configured $\beta$ offset value.

In one embodiment, the technical feature that "a characteristic sub-parameter value and a BPRE value of the first PUSCH are both used to determine the second parameter value" comprises the following meaning: the second parameter value $\Delta_{TF,b,f,c}(i)$ satisfies:

$$\Delta_{TF,f,c}(i) = 10\log_{10}\left(\left(2^{BPRE \cdot K_s} - 1\right)/K_w \cdot \beta_{offset}^{PUSCH}\right)$$

herein, $K_s$ is a configured parameter, $K_w$ represents the characteristic sub-parameter value, and $$\beta_{offset}^{PUSCH}$$

is equal to a predefined or configured $\beta$ offset value.

In one embodiment, the technical feature that "a characteristic sub-parameter value and a BPRE value of the first PUSCH are both used to determine the second parameter value" comprises the following meaning: the second parameter value $\Delta_{TF,b,f,c}(i)$ satisfies:

$$\Delta_{TF,f,c}(i) = 10\log_{10}\left(\left(2^{BPRE \cdot (K_s - K_w)} - 1\right) \cdot \beta_{offset}^{PUSCH}\right)$$

herein, $K_s$ is a configured parameter, $K_w$ represents the characteristic sub-parameter value, and $$\beta_{offset}^{PUSCH}$$

is equal to a predefined or configured $\beta$ offset value.

In one embodiment, the technical feature that "a characteristic sub-parameter value and a BPRE value of the first PUSCH are both used to determine the second parameter value" comprises the following meaning: the second parameter value $\Delta_{TF,b,f,c}(i)$ satisfies:

$$\Delta_{TF,f,c}(i) = 10\log_{10}\left(\left(2^{BPRE \cdot (K_s + K_w)} - 1\right) \cdot \beta_{offset}^{PUSCH}\right)$$

herein, $K_s$ is a configured parameter, $K_w$ represents the characteristic sub-parameter value, and $$\beta_{offset}^{PUSCH}$$

is equal to a predefined or configured $\beta$ offset value.

In one embodiment, the first sub-parameter value set only comprises 4 sub-parameter values.

In one embodiment, the first sub-parameter value set only comprises 3 sub-parameter values.

In one embodiment, the first sub-parameter value set only comprises 2 sub-parameter values.

In one embodiment, a number of sub-parameter values comprised in the first sub-parameter value set is greater than 2.

In one embodiment, a number of sub-parameter values comprised in the first sub-parameter value set is greater than 1.

In one embodiment, a number of sub-parameter value(s) comprised in the first sub-parameter value set is equal to 1.

In one embodiment, a sub-parameter value comprised in the first sub-parameter value set is equal to 0.

In one embodiment, a sub-parameter value comprised in the first sub-parameter value set is equal to 1.

In one embodiment, a sub-parameter value comprised in the first sub-parameter value set is less than 1.

In one embodiment, a sub-parameter value comprised in the first sub-parameter value set is greater than 1.

In one embodiment, a sub-parameter value comprised in the first sub-parameter value set is less than 0.

In one embodiment, the first sub-parameter value set comprises 1.25, 0 and another sub-parameter value.

In one embodiment, the first sub-parameter value set only comprises 1.25 and 0.

In one embodiment, any two sub-parameter values in the first sub-parameter value set are not equal.

In one embodiment, the first sub-parameter value set being predefined refers to: the first sub-parameter value set is fixed.

In one embodiment, the first sub-parameter value set being predefined refers to: the first sub-parameter value set is hard coded in the protocol.

In one embodiment, the first sub-parameter value set being configured refers to: all or part comprised in the first information block is used to explicitly or implicitly determine the first sub-parameter value set.

In one embodiment, the first sub-parameter value set being configured refers to: all or part comprised in an information block other than the first information block is used to explicitly or implicitly determine the first sub-parameter value set.

In one embodiment, the first sub-parameter value set being configured refers to: all or part comprised in the first information block is used to explicitly or implicitly determine at least one sub-parameter value comprised in the first sub-parameter value set.

In one embodiment, the first sub-parameter value set being configured refers to: all or part comprised in an information block other than the first information block is used to explicitly or implicitly determine at least one sub-parameter value comprised in the first sub-parameter value set.

In one embodiment, the first sub-parameter value set being configured refers to: the first information block being configured or provided is used to determine at least one sub-parameter value comprised in the first sub-parameter value set.

In one embodiment, the first sub-parameter value set being configured refers to: whether an information block other than the first information block is configured or provided is used to determine at least one sub-parameter value comprised in the first sub-parameter value set.

In one embodiment, the first sub-parameter value set being configured refers to: all or part comprised in the first information block is used to explicitly or implicitly indicate dynamically enabling/disabling or on/off transform precoding (or transform precoder), and dynamically enabling/disabling or on/off transform precoding (or transform precoder) is used to determine the first sub-parameter set.

In one embodiment, the first sub-parameter value set being configured refers to: all or part comprised in the first information block is used to explicitly or implicitly indicate dynamically enabling/disabling or on/off transform precoding (or transform precoder), and dynamically enabling/disabling or on/off transform precoding (or transform precoder) is used to determine that the first sub-parameter value set comprises at least one sub-parameter value other than 1.25 or 0.

In one embodiment, the first sub-parameter value set being configured refers to: all or part comprised in the first information block is used to explicitly or implicitly indicate dynamically enabling/disabling or on/off transform precoding (or transform precoder), and dynamically enabling/disabling or on/off transform precoding (or transform precoder) is used to determine that a sub-parameter value in the first sub-parameter value set is used to calculate the second parameter value.

In one embodiment, the first sub-parameter value set being configured refers to: all or part comprised in the first information block is used to explicitly or implicitly indicate dynamically enabling/disabling or on/off transform precoding (or transform precoder), and dynamically enabling/disabling or on/off transform precoding (or transform precoder) is used to determine an existence of the first sub-parameter value set.

In one embodiment, the first sub-parameter value set being configured refers to: when the first information block is not provided or all or part comprised in the first information block is used to explicitly or implicitly indicate that dynamically enabling/disabling or on/off transform precoding (or transform precoder) is not enabled, the first sub-parameter value set is a sub-parameter value set; all or part comprised in the first information block is used to explicitly or implicitly indicate that dynamically enabling/disabling or on/off transform precoding (or transform precoder) is enabled, the first sub-parameter value set is another sub-parameter value set.

In one embodiment, the first sub-parameter value set being configured refers to: all or part comprised in the first information block is used to explicitly or implicitly indicate a dynamic conversion of an uplink waveform, and the dynamic conversion of the uplink waveform is used to determine the first sub-parameter value set.

In one embodiment, the first sub-parameter value set being configured refers to: all or part comprised in the first information block is used to explicitly or implicitly indicate a dynamic conversion of an uplink waveform, and the dynamic conversion of the uplink waveform is used to determine that the first sub-parameter value set comprises at least one sub-parameter value other than 1.25 or 0.

In one embodiment, the first sub-parameter value set being configured refers to: all or part comprised in the first information block is used to explicitly or implicitly indicate a dynamic conversion of an uplink waveform, and the dynamic conversion of the uplink waveform is used to determine a sub-parameter value in the first sub-parameter value set is used to calculate the second parameter value.

In one embodiment, the first sub-parameter value set being configured refers to: all or part comprised in the first information block is used to explicitly or implicitly indicate a dynamic conversion of an uplink waveform, and the dynamic conversion of the uplink waveform is used to determine an existence of the first sub-parameter value set.

In one embodiment, the first sub-parameter value set being configured refers to: when the first information block is not provided or all or part comprised in the first information block is used to explicitly or implicitly indicate that when a dynamic conversion of an uplink waveform is not enabled, the first sub-parameter value set is a sub-parameter value set; when all or part comprised in the first information block is used to explicitly or implicitly indicate that a dynamic waveform conversion is enabled, the first sub-parameter value set is another sub-parameter value set.

In one embodiment, the technical feature that "the target waveform is used to determine the characteristic sub-parameter values from the first sub-parameter value set" comprises the following meaning: the target waveform is used by the first node in the present application to determine the characteristic sub-parameter value from the first sub-parameter value set.

In one embodiment, the technical feature that "the target waveform is used to determine the characteristic sub-parameter values from the first sub-parameter value set" comprises the following meaning: the target waveform is used to determine the characteristic sub-parameter value from the first sub-parameter value set according to a corresponding relation or mapping relation.

In one embodiment, the technical feature that "the target waveform is used to determine the characteristic sub-parameter values from the first sub-parameter value set" comprises the following meaning: the target waveform is used to determine the characteristic sub-parameter value from the first sub-parameter value set according to a conditional relation.

In one embodiment, the technical feature that "the target waveform is used to determine the characteristic sub-parameter values from the first sub-parameter value set" comprises the following meaning: the X1 candidate waveforms respectively correspond to X1 sub-parameter values in the first sub-parameter value set, and the characteristic sub-parameter value is equal to a sub-parameter value corresponding to the target waveform in the X1 sub-parameter values.

In one embodiment, the technical feature that "the target waveform is used to determine the characteristic sub-parameter values from the first sub-parameter value set" comprises the following meaning: the target waveform and the first information block are used together to determine the characteristic sub-parameter value from the first sub-parameter value set.

In one embodiment, the technical feature that "the target waveform is used to determine the characteristic sub-parameter values from the first sub-parameter value set" comprises the following meaning: when the target waveform is a waveform, the characteristic sub-parameter value is equal to a sub-parameter value in the first sub-parameter value set; when the target waveform is another waveform, the characteristic sub-parameter value is equal to another sub-parameter value in the first sub-parameter value set.

In one embodiment, the first information block is also used to determine the characteristic sub-parameter value from the first sub-parameter value set.

In one embodiment, an information block other than the first information block is also used to determine the characteristic sub-parameter value from the first sub-parameter value set.

In one embodiment, the technical feature that "the target waveform is used to determine the characteristic sub-parameter values from the first sub-parameter value set" comprises the following meaning: a characteristic field is a field comprised in the first information block; when the first information block is not provided or configured or a value or state of the characteristic field in the first information block is equal to a first predetermined value or state, the characteristic sub-parameter value is equal to a first sub-parameter value in the first sub-parameter value set; when a value or state of the characteristic field in the first information block is equal to a second predetermined value or state and the target waveform is a waveform, the characteristic sub-parameter value is equal to a second sub-parameter value in the first sub-parameter value set; when a value or state of the characteristic field in the first information block is equal to a second predetermined value or state and the target waveform is another waveform, the characteristic sub-parameter value is equal to a third sub-parameter value in the first sub-parameter value set; the first sub-parameter value, the second sub-parameter value, and the third sub-parameter value are three distinct sub-parameter values in the first sub-parameter value set.

In one embodiment, the technical feature that "the target waveform is used to determine the characteristic sub-parameter value from the first sub-parameter value set" comprises the following meaning: whether a third information block is provided or configured is used together with the target waveform to determine the characteristic sub-parameter value from the first sub-parameter value set, and the third information block and the first information block are two different IEs or two different fields within a same IE.

In one embodiment, the technical feature that "the target waveform is used to determine the characteristic sub-parameter values from the first sub-parameter value set" comprises the following meaning: a third information block is a different information block from the first information block, and a reference field is a field comprised in the third information block; when a third information block is provided or configured, and the target waveform is a first one of waveforms among the X1 candidate waveforms, the characteristic sub-parameter value is equal to a first sub-parameter value in the first sub-parameter value set; when a third information block is provided or configured, and the target waveform is a second one of waveforms among the X1 candidate waveforms, the characteristic sub-parameter value is equal to a second sub-parameter value in the first sub-parameter value set; when a third information block is not provided or configured, and the target waveform is a first one of waveforms among the X1 candidate waveforms, the characteristic sub-parameter value is equal to a third sub-parameter value in the first sub-parameter value set; when the third information block is not provided or configured, and the target waveform is a second one of waveforms among the X1 candidate waveforms, the characteristic sub-parameter value is equal to a fourth sub-parameter value in the first sub-parameter value set, and any two of the first sub-parameter value, the second sub-parameter value, the third sub-parameter value, or the fourth sub-parameter value are not equal.

In one embodiment, the technical feature that "the target waveform is used to determine the characteristic sub-parameter values from the first sub-parameter value set" comprises the following meaning: when the first information block is not provided or configured, the characteristic sub-parameter value is equal to a first sub-parameter value in the first sub-parameter value set; when the first information block is provided or configured and the target waveform is a waveform, the characteristic sub-parameter value is equal to a second sub-parameter value in the first sub-parameter value set; when the first information block is provided or configured and the target waveform is another waveform, the characteristic sub-parameter value is equal to a third sub-parameter value in the first sub-parameter value set; the first sub-parameter value, the second sub-parameter value, and the third sub-parameter value are three distinct sub-parameter values in the first sub-parameter value set.

Embodiment 7

Embodiment 7 illustrates a schematic diagram of a first offset value set according to one embodiment of the present application, as shown in FIG. 7. In FIG. 7, the horizontal axis represents time, and each rectangle represents a DCI format that carries an offset value in a first offset value set, where D represents a number of offset value(s) comprised in a first offset value set.

In embodiment 7, the first DCI format in the present application is used to determine a target offset value, and the target waveform in the present application is used to determine a power control adjustment state adopted by the first PUSCH; the target offset value belongs to a first offset value set, the first offset value set comprises at least one offset value, any offset value comprised in the first offset value set is for a power control adjustment state adopted by the first PUSCH in the present application, and a sum of all offset values comprised in the first offset value set is used to determine the second parameter value in the present application.

In one embodiment, a target waveform is used to determine power control adjustment state, so as to support waveform-based close-loop power control and close-loop power control combining waveform and beam, thus improving the precision and convergence rate of close-loop power control.

In one embodiment, the target offset value is equal to a possible value of $\delta_{PUSCH,b,f,c}(i, 1)$.

In one embodiment, the target offset value is an integer.

In one embodiment, the target offset value is equal to a value of a transmission power control (TPC) command.

In one embodiment, the target offset value is an accumulated offset value.

In one embodiment, the target offset value is an absolute offset value.

In one embodiment, the target offset value is an offset value of power adjustment in close-loop power control.

In one embodiment, the target offset value is measured by dB.

In one embodiment, the target offset value is equal to one of −1, 0, 1, and 3.

In one embodiment, the target offset value is equal to one of −4, −1, 1, and 4.

In one embodiment, the technical feature that "the first DCI format is used to determine a target offset value" comprises the following meaning: the first DCI format is used by the first node in the present application to determine the target offset value.

In one embodiment, the technical feature that "the first DCI format is used to determine a target offset value" comprises the following meaning: all or partial fields comprised in the first DCI format are used to explicitly or implicitly indicate the target offset value.

In one embodiment, the technical feature that "the first DCI format is used to determine a target offset value" comprises the following meaning: all or partial fields comprised in the first DCI format are used to explicitly or implicitly indicate the target offset value from multiple pre-defined offset values.

In one embodiment, the technical feature that "the first DCI format is used to determine a target offset value" comprises the following meaning: a value of a TPC command field comprised in the first DCI format is used to indicate the target offset value from multiple predefined offset values based on a predefined mapping relation.

In one embodiment, the technical feature that "the first DCI format is used to determine a target offset value" comprises the following meaning: the second field comprised in the first DCI format is used to determine the target offset value.

In one embodiment, the technical feature that "the first DCI format is used to determine a target offset value" comprises the following meaning: a field other than the second field comprised in the first DCI format is used to determine the target offset value.

In one embodiment, a power control adjustment state adopted by the first PUSCH is a close-loop power control process (or procedure) to which the first PUSCH belongs.

In one embodiment, a power control adjustment state adopted by the first PUSCH is a close-loop power loop to which the first PUSCH belongs.

In one embodiment, a power control adjustment state adopted by the first PUSCH is a power control adjustment state represented by 1 in $f_{b,f,c}(i, 1)$ corresponding to the first PUSCH.

In one embodiment, an index or number of a power control adjustment state adopted by the first PUSCH is equal to one of 0 or 1.

In one embodiment, an index or number of a power control adjustment state adopted by the first PUSCH is equal to one of 0 or 1 or 2.

In one embodiment, an index or number of a power control adjustment state adopted by the first PUSCH is equal to one of 0 or 1 or 2 or 3.

In one embodiment, the technical feature that "the target waveform is used to determine a power control adjustment state adopted by the first PUSCH" comprises the following meaning: the target waveform is used by the first node in the present application to determine a power control adjustment state adopted by the first PUSCH.

In one embodiment, the technical feature that "the target waveform is used to determine a power control adjustment state adopted by the first PUSCH" comprises the following meaning: the target waveform is used to determine an index or number of a power control adjustment state adopted by the first PUSCH.

In one embodiment, the technical feature that "the target waveform is used to determine a power control adjustment state adopted by the first PUSCH" comprises the following meaning: the target waveform is used to determine an index or number of a power control adjustment state adopted by the first PUSCH according to a mapping relation or corresponding relation.

In one embodiment, the technical feature that "the target waveform is used to determine a power control adjustment state adopted by the first PUSCH" comprises the following meaning: the target waveform is used to determine an index or number of a power control adjustment state adopted by the first PUSCH according to a condition relation.

In one embodiment, the technical feature that "the target waveform is used to determine a power control adjustment state adopted by the first PUSCH" comprises the following meaning: the X1 candidate waveforms respectively correspond to X1 power control adjustment state indexes, and an index of a power control adjustment state adopted by the first PUSCH is equal to a power control adjustment state index corresponding to the target waveform in the X1 power control adjustment state indexes.

In one embodiment, the technical feature that "the target waveform is used to determine a power control adjustment state adopted by the first PUSCH" comprises the following meaning: when the target waveform is a waveform, an index of a power control adjustment state adopted by the first PUSCH is equal to an index value; when the target waveform is another waveform, an index of the power control adjustment state adopted by the first PUSCH is equal to another index value.

In one embodiment, the technical feature that "the target waveform is used to determine a power control adjustment state adopted by the first PUSCH" comprises the following meaning: the second field comprised in the first DCI format and the target waveform are used together to determine a power control adjustment state adopted by the first PUSCH.

In one embodiment, the technical feature that "the target waveform is used to determine a power control adjustment state adopted by the first PUSCH" comprises the following meaning: the second field comprised in the first DCI format is used to determine a target index value, and the target index value and the target waveform are used together to determine an index of a power control adjustment state adopted by the first PUSCH.

In one embodiment, the technical feature that "the target waveform is used to determine a power control adjustment state adopted by the first PUSCH" comprises the following meaning: P1 groups respectively correspond to P1 power control adjustment state indexes, and any of the P1 groups comprises a candidate value of the second field and one of the X1 candidate waveforms, P1 being a positive integer greater than 1; an index of a power control adjustment state adopted by the first PUSCH is equal to a power control adjustment state index corresponding to a group of a value comprising the second field in the first DCI format and the target waveform.

In one embodiment, the technical feature that "the target waveform is used to determine a power control adjustment state adopted by the first PUSCH" comprises the following meaning: when a value of the second field in the first DCI format is equal to a first candidate value and the target waveform is a first one of candidate waveforms among the X1 candidate waveforms, an index of a power control adjustment state adopted by the first PUSCH is equal to a first candidate index value; when a value of the second field in the first DCI format is equal to a first candidate value and the target waveform is a second one of candidate waveforms among the X1 candidate waveforms, an index of a power control adjustment state adopted by the first PUSCH is equal to a second candidate index value; when a value of the second field in the first DCI format is equal to a second candidate value and the target waveform is a first one of candidate waveforms among the X1 candidate waveforms, an index of a power control adjustment state adopted by the first PUSCH is equal to a third candidate index value; when a value of the second field in the first DCI format is equal to a second candidate value and the target waveform is a second one of candidate waveforms among the X1 candidate waveforms, an index of a power control adjustment state adopted by the first PUSCH is equal to a fourth candidate index value; herein, the first candidate value and the second candidate value are not equal, and the first candidate waveform and the second candidate waveform are different, a first candidate index value, a second candidate index value, a third candidate index value, and a fourth candidate index value are four candidate index values that are not equal to each other.

In one embodiment, the technical feature that "the target waveform is used to determine a power control adjustment state adopted by the first PUSCH" comprises the following meaning: when a value of the second field in the first DCI format is equal to a first candidate value and the target waveform is a first one of candidate waveforms among the X1 candidate waveforms, an index of a power control adjustment state adopted by the first PUSCH is equal to a first candidate index value; when a value of the second field in the first DCI format is equal to a second candidate value and the target waveform is a first one of candidate waveforms among the X1 candidate waveforms, an index of a power control adjustment state adopted by the first PUSCH is equal to a second candidate index value; when the target waveform is a second one of candidate waveforms among the X1 candidate waveforms, an index of the power control adjustment state adopted by the first PUSCH is equal to a third candidate index value; herein, the first candidate value and the second candidate value are not equal, and the first candidate waveform and the second candidate waveform are different; a first candidate index value, a second candidate index value and a third candidate index value are three candidate index values that are not equal to each other.

In one embodiment, the technical feature that "the target waveform is used to determine a power control adjustment state adopted by the first PUSCH" comprises the following meaning: when a value of the second field in the first DCI format is equal to a first candidate value and the target waveform is a first one of candidate waveforms among the X1 candidate waveforms, an index of a power control adjustment state adopted by the first PUSCH is equal to a first candidate index value; otherwise, an index of a power control adjustment state adopted by the first PUSCH is equal to a second candidate index value; herein, the first candidate value and second candidate values are not equal, and a first candidate index value and a second candidate index values are not equal.

In one embodiment, any offset value comprised in the first offset value set is equal to a possible value of $\delta_{PUSCH,b,f,c}(i, l)$.

In one embodiment, any offset value comprised in the first offset value set is an integer.

In one embodiment, any offset value comprised in the first offset value set is equal to a value of a transmission power control (TPC) command.

In one embodiment, any offset value comprised in the first offset value set is an accumulated offset value.

In one embodiment, any offset value comprised in the first offset value set is a possible offset value for power adjustment in close-loop power control.

In one embodiment, any offset value comprised in the first offset value set is measured by dB.

In one embodiment, any offset value comprised in the first offset value set is equal to one of −1, 0, 1 and 3.

In one embodiment, any offset value comprised in the first offset value set is equal to one of −4, −1, 1, and 4.

In one embodiment, any two offset values in the first offset value set are not equal.

In one embodiment, the first offset value set comprises two equal offset values.

In one embodiment, any two offset values in the first offset value set are the values of two different TPC commands.

In one embodiment, any two offset values in the first offset value set are values of TPC commands respectively carried by two different PDCCHs.

In one embodiment, any two offset values in the first offset value set are values of TPC commands respectively carried by two PDCCHs that occupy different time-frequency resources.

In one embodiment, any two offset values in the first offset value set are values of TPC commands respectively carried by two PDCCHs belonging to a same time window in time domain.

In one embodiment, any two offset values in the first offset value set are values of two TPC commands received within a same time window.

In one embodiment, any two offset values in the first offset value set are values of two TPC commands received within a first time window, the first time window is a time window between $K_{PUSCH}(2)$ time-domain symbols earlier than a second transmission occasion and $K_{PUSCH}(1)$ time domain symbols earlier than a first transmission occasion, the first transmission occasion is a time-domain occasion to which the first PUSCH belongs in time domain, and the second time-domain occasion is a PUSCH transmission occasion earlier than the first transmission occasion; $K_{PUSCH}(1)$ is equal to a number of time-domain symbol(s) between a latest time-domain symbol occupied by a PDCCH carrying the first DCI format and an earliest time-domain symbol occupied by the first PUSCH, and $K_{PUSCH}(2)$ is equal to a number of time-domain symbol(s) between a latest time-domain symbol occupied by a PDCCH scheduling a PUSCH belonging to the second transmission occasion and an earliest time-domain symbol occupied by a PUSCH belonging to the second transmission occasion.

In one embodiment, any two offset values comprised in the first offset value set are for a same power control modulation state.

In one embodiment, any two offset values comprised in the first offset value set correspond to indexes of same power control adjustment states.

In one embodiment, any two offset values comprised in the first offset value set are used for a same close-loop power control process.

In one embodiment, any two offset values comprised in the first offset value set belong to a same close-loop power control loop.

In one embodiment, any two offset values comprised in the first offset value set are equal to values of two TPC commands belonging to a same power control adjustment state.

In one embodiment, power control adjustment states of PUSCHs respectively scheduled by two PDCCHs carrying any two offset values comprised in the first offset value set are the same.

In one embodiment, indexes of power control modulation states of PUSCHs respectively scheduled by two PDCCHs carrying any two offset values comprised in the first offset value set are equal to indexes of the power control modulation states adopted by the first PUSCH.

In one embodiment, the technical feature that "a sum of all offset values comprised in the first offset value set is used to determine the second parameter value" comprises the following meaning: a sum of all offset values comprised in the first offset value set is used by the first node in the present application to determine the second parameter value.

In one embodiment, the technical feature that "a sum of all offset values comprised in the first offset value set is used to determine the second parameter value" comprises the following meaning: a sum of all offset values comprised in the first offset value set is used to calculate the second parameter value.

In one embodiment, the technical feature that "a sum of all offset values comprised in the first offset value set is used to determine the second parameter value" comprises the following meaning: the second parameter value is linearly correlated with a sum of all offset values comprised in the first offset value set.

In one embodiment, the technical feature that "a sum of all offset values comprised in the first offset value set is used to determine the second parameter value" comprises the following meaning: the second parameter value is proportional to a sum of all offset values comprised in the first offset value set.

In one embodiment, the technical feature that "a sum of all offset values comprised in the first offset value set is used to determine the second parameter value" comprises the following meaning: the second parameter value is equal to a sum of all offset values comprised in the first offset value set.

In one embodiment, the technical feature that "a sum of all offset values comprised in the first offset value set is used to determine the second parameter value" comprises the following meaning: the second parameter value is equal to a sum of all offset values comprised in the first offset value set plus a value of the second parameter at a PUSCH transmission occasion earlier than the first PUSCH.

In one embodiment, the technical feature that "a sum of all offset values comprised in the first offset value set is used to determine the second parameter value" comprises the following meaning: the second parameter value $f_{b,f,c}(i, l)$ satisfies the following formula:

$$f_{b,f,c}(i,l)=f_{b,f,c}(i-i_0,l)+\sum_{m=0}^{\mathcal{C}(D_i)-1}\delta_{PUSCH,b,f,c}(m,l)$$

herein, $f_{b,f,c}(i-i_0, 1)$ represents a value of the second parameter in a PUSCH transmission occasion $i-i_0$, $C(D_i)$ represents a number of offset value(s) comprised in the first offset value set, and $\delta_{PUSCH,b,f,c}(m, 1)$ represents an offset value in the first offset value set.

Embodiment 8

Embodiment 8 illustrates a schematic diagram of a first report according to one embodiment of the present application, as shown in FIG. 8. In FIG. 8, two rectangles respectively represent a first upper limit value and the target power value, a first report carries a difference value between a first upper limit value and a target power value.

In embodiment 8, the first PUSCH in the present application carries a first report, the first report is used to indicate a difference value between the first upper limit value in the present application and the target power value in the present application, and the first DCI format is an earliest DCI format after the first report is triggered.

In one embodiment, the first report a Power Headroom Report (PHR).

In one embodiment, the first report is a type 1 PHR.

In one embodiment, the first report is a type 2 PHR.

In one embodiment, the first report is transferred through the MAC layer.

In one embodiment, the technical feature that "the first PUSCH carries a first report" comprises the following meaning: the first PUSCH carries a transport block (TB) comprising the first report.

In one embodiment, the technical feature that "the first PUSCH carries a first report" comprises the following meaning: the first report is transmitted on the first PUSCH.

In one embodiment, the technical feature that "the first PUSCH carries a first report" comprises the following meaning: a UL-SCH carried by the first PUSCH comprises the first report.

In one embodiment, the technical feature that "the first PUSCH carries a first report" comprises the following meaning: MAC layer information transmitted on the first PUSCH comprises the first report.

In one embodiment, the technical feature that "the first PUSCH carries a first report" comprises the following meaning: a MAC CE (control element) transmitted on the first PUSCH comprises the first report.

In one embodiment, the technical feature that "the first PUSCH carries a first report" comprises the following meaning: a MAC Protocol data unit (MAC PDU) transmitted on the first PUSCH comprises the first report.

In one embodiment, the technical feature that "the first PUSCH carries a first report" comprises the following meaning: the first report is used to generate a MAC PDU, and the MAC PDU generated by the first report is used to generate a baseband signal or an RF signal of the first PUSCH.

In one embodiment, the technical feature that "the first report is used to indicate a difference value between the first upper limit value and the target power value" comprises the following meaning: the first report is used by the first node device in the present application to indicate a difference value between the first upper limit value and the target power value In one embodiment, the technical feature that "the first report is used to indicate a difference value between the first upper limit value and the target power value" comprises the following meaning: the first report is used to explicitly or implicitly indicate a difference value between the first upper limit value and the target power value.

In one embodiment, the technical feature that "the first report is used to indicate a difference value between the first upper limit value and the target power value" comprises the following meaning: the first report is used to indicate an interval to which a difference value between the first upper limit value and the target power value belongs.

In one embodiment, the technical feature that "the first report is used to indicate a difference value between the first upper limit value and the target power value" comprises the following meaning: the first report is used to indicate a power margin level to which a difference value between the first upper limit value and the target power value belongs.

In one embodiment, the technical feature that "the first report is used to indicate a difference value between the first upper limit value and the target power value" comprises the following meaning: a difference value between the first upper limit value and the target power value belongs to the first interval, the first interval is one of multiple intervals, the first report is used to indicate an index or identity of the first interval among the multiple intervals, and the multiple intervals are predefined.

In one embodiment, the technical feature that "the first report is used to indicate a difference value between the first upper limit value and the target power value" comprises the following meaning: a difference value between the first upper limit value and the target power value belongs to a first power margin level, the first power margin level is one of multiple power margin levels, the first report is used to indicate an index or identity of the first power margin level among the multiple power margin levels, and the multiple power margin levels are predefined.

In one embodiment, the technical feature that "the first DCI format is an earliest DCI format after the first report is triggered" comprises the following meaning: the first DCI format is an earliest DCI format scheduling an initial transmission after the first report is triggered.

In one embodiment, the technical feature that "the first DCI format is an earliest DCI format after the first report is triggered" comprises the following meaning: the first DCI format is a DCI format of an earliest scheduled PUSCH after the first report is triggered.

In one embodiment, the technical feature that "the first DCI format is an earliest DCI format after the first report is triggered" comprises the following meaning: the first DCI format is an earliest DCI format scheduling a PUSCH carrying an initial transmission after the first report is triggered.

In one embodiment, the technical feature that "the first DCI format is an earliest DCI format after the first report is triggered" comprises the following meaning: before the first DCI format and after the first report is triggered, there does not exist a DCI format other than the first DCI format scheduling a PUSCH carrying an initial transmission.

Embodiment 9

Embodiment 9 illustrates a schematic diagram of a target size according to one embodiment of the present application, as shown in FIG. 9. In FIG. 9, each rectangle represents a candidate size corresponding to at least one of the X1 candidate waveforms, and the cross-line-filled rectangle represents a target size.

In embodiment 9, the first DCI format in the present application comprises a third field, a target size is equal to a size of the third field comprised in the first DCI format, and the target size is equal to a maximum candidate size among multiple candidate sizes corresponding to the X1 candidate waveforms in the present application.

In one embodiment, a target size is equal to a maximum candidate size among candidate sizes corresponding to X1 candidate waveforms, ensuring the correct reception of the DCI format.

In one embodiment, the third field is a "Precoding information and number of layers" field.

In one embodiment, the third field is a "Second Precoding information" field.

In one embodiment, the third field is an "Antenna ports" field.

In one embodiment, the third field is a "PTRS-DMRS association" field.

In one embodiment, the third field is a "DMRS sequence initialization" field.

In one embodiment, the third field is a field related to a demodulation reference signal of the first PUSCH.

In one embodiment, when the target size is greater than 0, the definition of the third field comprised in the first DCI format is related to the target waveform.

In one embodiment, the third field is used to explicitly or implicitly indicate a number of layer(s) occupied by the first PUSCH and an adopted transmitted precoding matrix indicator (TPMI).

In one embodiment, the third field is used to explicitly or implicitly indicate time-frequency-code domain resources occupied by a demodulation reference signal of the first PUSCH.

In one embodiment, the third field is used to explicitly or implicitly indicate a number of Code Division Multiplexing (CDM) group(s) corresponding to a demodulation reference signal of the first PUSCH and a demodulation reference signal port to which it belongs.

In one embodiment, the third field is used to explicitly or implicitly indicate at least one of a number of CDM group(s) corresponding to a demodulation reference signal of the first PUSCH, a demodulation reference signal port to which it belongs, an initial value of the adopted scrambling sequence or a number of occupied front-load time-domain symbol(s).

In one embodiment, the third field is used to explicitly or implicitly indicate an association relation between a phase tracking reference signal (PTRS) and a demodulation reference signal of the first PUSCH.

In one embodiment, the third field is used to explicitly or implicitly indicate an initialization of a generation sequence of a demodulation reference signal of the first PUSCH In one embodiment, the third field comprises at least one padding bit.

In one embodiment, the third field does not comprise any padding bit.

In one embodiment, the third field is neither a starting field nor an ending field comprised in the first DCI format.

In one embodiment, the third field and the first field are respectively two different fields.

In one embodiment, the third field and the second field are respectively two different fields.

In one embodiment, a size of the third field comprised in the first DCI format is a number of bit(s) comprised in the third field in the first DCI format.

In one embodiment, a size of the third field comprised in the first DCI format is a number of information bit(s) comprised in the third field in the first DCI format.

In one embodiment, a size of the third field comprised in the first DCI format is the bitwidth of the third field in the first DCI format.

In one embodiment, a size of the third field comprised in the first DCI format is a number of non-padding bit(s) comprised in the third field in the first DCI format.

In one embodiment, a size of the third field comprised in the first DCI format is a total number of bits of non-padding bit(s) and padding bits comprised in the third field in the first DCI format.

In one embodiment, the target size can be equal to 0.

In one embodiment, the target size can be greater than 0.

In one embodiment, any of the X1 candidate waveforms only corresponds to one candidate size.

In one embodiment, one of the X1 candidate waveforms corresponds to more than one candidate size. In one embodiment, any of the X1 candidate waveforms corresponds to at least one candidate size.

In one embodiment, any candidate size corresponding to any of the X1 candidate waveforms is a possible size of the third field.

In one embodiment, any candidate size corresponding to any of the X1 candidate waveforms is a possible size of the third field for the candidate waveform.

In one embodiment, any candidate size corresponding to any of the X1 candidate waveforms is a possible size of the third field when a PUSCH adopting that candidate waveform is scheduled.

In one embodiment, in the condition of given values or states of other parameters, any of the X1 candidate waveforms only corresponds to one candidate size.

In one embodiment, the technical feature that "the target size is equal to a maximum candidate size corresponding to the X1 candidate waveforms among multiple candidate sizes" comprises the following meaning: the X1 candidate waveforms respectively correspond to X1 candidate sizes, and the target size is equal to a maximum value among the X1 candidate sizes.

In one embodiment, the technical feature that "the target size is equal to a maximum candidate size corresponding to the X1 candidate waveforms among multiple candidate sizes" comprises the following meaning: the X1 candidate waveforms respectively correspond to X1 candidate sizes, the X1 candidate sizes are possible sizes of the third field respectively for the X1 candidate waveforms in the condition of given configured parameters other than a waveform; the target size is equal to a maximum value among the X1 candidate sizes.

In one embodiment, the technical feature that "the target size is equal to a maximum candidate size corresponding to the X1 candidate waveforms among multiple candidate sizes" comprises the following meaning: a characteristic waveform is one of the X1 candidate waveforms, a size of the third field for the characteristic waveform is larger than a size of the third field for any other candidate waveform among the X1 candidate waveforms, the target size is equal to a size of the third field for the characteristic waveform. In one subsidiary embodiment of the above embodiment, the characteristic waveform is a CP-OFDM. In one subsidiary embodiment of the above embodiment, the characteristic waveform is a DFT-s-OFDM. In one subsidiary embodiment of the above embodiment, the characteristic waveform is an OFDM with transform precoding turned off. In one subsidiary embodiment of the above embodiment, the characteristic waveform is an OFDM with transform precoding turned on.

In one embodiment, the technical feature that "the target size is equal to a maximum candidate size corresponding to the X1 candidate waveforms among multiple candidate sizes" comprises the following meaning: a characteristic waveform is one of the X1 candidate waveforms, in the condition of given other parameters, a size of the third field for the characteristic waveform is larger than a size of the third field for any other candidate waveform among the X1 candidate waveforms; the target size is equal to a size of the third field for the characteristic waveform. In one subsidiary embodiment of the above embodiment, the characteristic waveform is a CP-OFDM. In one subsidiary embodiment of the above embodiment, the characteristic waveform is a DFT-s-OFDM. In one subsidiary embodiment of the above embodiment, the characteristic waveform is an OFDM with transform precoding turned off. In one subsidiary embodiment of the above embodiment, the characteristic waveform is an OFDM with transform precoding turned on.

In one embodiment, the technical feature that "the target size is equal to a maximum candidate size corresponding to the X1 candidate waveforms among multiple candidate sizes" comprises the following meaning: the target size is equal to a maximum candidate size among candidate sizes corresponding to the X1 candidate waveforms in the condition of a given parameter value set, and any given parameter value comprised in the given parameter value set is a parameter value other than a waveform.

In one embodiment, the technical feature that "the target size is equal to a maximum candidate size corresponding to the X1 candidate waveforms among multiple candidate sizes" comprises the following meaning: the target size is equal to a maximum candidate size among candidate sizes corresponding to the X1 candidate waveforms in the condition of a given parameter value set, and the given parameter value set comprises at least one of parameter values of transmission scheme (codebook based or non-codebook based transmission), full power mode, maximum rank, codebook subset, demodulation reference signal type, maximum length of a demodulation reference signal, modulation encoding method, SRS resource indication value.

In one embodiment, the technical feature that "the target size is equal to a maximum candidate size corresponding to the X1 candidate waveforms among multiple candidate sizes" comprises the following meaning: the target size is equal to a size of the third field obtained by a candidate waveform leading to a largest size of the third field among the X1 candidate waveforms.

In one embodiment, the technical feature that "the target size is equal to a maximum candidate size corresponding to the X1 candidate waveforms among multiple candidate sizes" comprises the following meaning: any candidate size corresponding to X1 candidate waveforms is one of X2 candidate sizes, and X2 is not less than X1, the X2 candidate sizes respectively correspond to X2 parameter value groups, any of the X2 parameter value groups comprises at least one parameter value, and at least one parameter value group among the X2 parameter value groups comprises a candidate waveform parameter value; in the condition of parameter values other than all candidate waveform parameter values comprised in the X2 parameter value group are given, a parameter value group comprising candidate waveform parameter values in the X2 parameter value groups corresponds to a maximum value in all candidate sizes in the X2 candidate sizes.

In one embodiment, the technical feature that "the target size is equal to a maximum candidate size corresponding to the X1 candidate waveforms among multiple candidate sizes" comprises the following meaning: the target size is equal to a size of the third field assuming that the target waveform is DFT-s-OFDM.

In one embodiment, the technical feature that "the target size is equal to a maximum candidate size corresponding to the X1 candidate waveforms among multiple candidate sizes" comprises the following meaning: the target size is equal to a size of the third field for DFT-s-OFDM.

In one embodiment, the technical feature that "the target size is equal to a maximum candidate size corresponding to the X1 candidate waveforms among multiple candidate sizes" comprises the following meaning: the target size is equal to a size of the third field when transform precoding (or transform precoder) is turned on.

In one embodiment, the technical feature that "the target size is equal to a maximum candidate size corresponding to the X1 candidate waveforms among multiple candidate sizes" comprises the following meaning: the target size is equal to a size of the third field assuming that the target waveform is CP-OFDM.

In one embodiment, the technical feature that "the target size is equal to a maximum candidate size corresponding to the X1 candidate waveforms among multiple candidate sizes" comprises the following meaning: the target size is equal to a size of the third field for CP-OFDM.

In one embodiment, the technical feature that "the target size is equal to a maximum candidate size corresponding to the X1 candidate waveforms among multiple candidate sizes" comprises the following meaning: the target size is equal to a size of the third field when transform precoding (or transform precoder) is turned off.

In one embodiment, a size of the third field when transform precoding (or transform precoder) is turned off is always not less than a size of the third field when transform precoding (or transform precoder) is turned on.

In one embodiment, a size of the third field when transform precoding (or transform precoder) is turned off is always not greater than a size of the third field when transform precoding (or transform precoder) is turned on.

In one embodiment, a size of the third field for CP-OFDM is always not less than a size of the third field for DFT-s-OFDM.

In one embodiment, a size of the third field for CP-OFDM is always not greater than a size of the third field for DFT-s-OFDM.

In one embodiment, a size of the third field is not equal for two different candidate waveforms among the X1 candidate waveforms, and "0" bit or "1" bit is added to the third field with a smaller size until sizes of the third fields for any two candidate waveforms among the X1 candidate waveforms are equal.

In one embodiment, a size of the third field for one of the X1 candidate waveforms is not equal to a size of the third field for another candidate waveform in the X1 candidate waveforms, and at least one Most significant bit (MSB) equal to "0" is added in the third field with a smaller size until sizes of the third fields for any two of the X1 candidate waveforms are equal.

In one embodiment, a size of the third field for one of the X1 candidate waveforms is not equal to a size of the third field for another candidate waveform in the X1 candidate waveforms, and at least one MSB bit equal to "1" is added in the third field with a smaller size until sizes of the third fields for any two of the X1 candidate waveforms are equal.

In one embodiment, a size of the third field for one of the X1 candidate waveforms is not equal to a size of the third field for another candidate waveform in the X1 candidate waveforms, and at least one Least Significant bit (LSB)

equal to "0" is added in the third field with a smaller size until sizes of the third fields for any two of the X1 candidate waveforms are equal.

In one embodiment, a size of the third field for one of the X1 candidate waveforms is not equal to a size of the third field for another candidate waveform in the X1 candidate waveforms, and at least one Least Significant bit (LSB) equal to "1" is added in the third field with a smaller size until sizes of the third fields for any two of the X1 candidate waveforms are equal.

In one embodiment, the first DCI format comprises that the second field is related to at least one capability parameter of a transmitter of the first PUSCH.

In one embodiment, at least one capability parameter of a transmitter of the first PUSCH is used to determine that the first DCI format comprises the second field.

In one embodiment, at least one capability parameter of a transmitter of the first PUSCH is used to determine whether a dynamic switch of transform precoding (or transform precoder) is supported, and the first DCI format comprises that the second field and the dynamic switch of transform precoding (or transform precoder) are equivalent.

In one embodiment, at least one capability parameter of a transmitter of the first PUSCH is used to determine whether dynamically switching of uplink transmission waveform is supported, and the first DCI format comprises that the second field and dynamically switching supporting uplink transmission waveforms are equivalent.

In one embodiment, a first waveform and a second waveform are respectively two different candidate waveforms among the X1 candidate waveforms, and a size of the third field corresponding to the first waveform and a size of the third field corresponding to the second waveform are not equal; at least one MSB equal to "0" is added in the third field with a relatively smaller size between the size of the third field corresponding to the first waveform and the size of the third field corresponding to the second waveform until the size of the third field corresponding to the first waveform is equal to the size of the third field corresponding to the second waveform. In one subsidiary embodiment of the above embodiment, the first waveform is CP-OFDM, and the second waveform is DFT-s-OFDM. In one subsidiary embodiment of the above embodiment, the second waveform is CP-OFDM, and the first waveform is DFT-s-OFDM. In one subsidiary embodiment of the above embodiment, the first waveform is OFDM with transform precoding disabled, and the second waveform is OFDM with transform precoding enabled. In one subsidiary embodiment of the above embodiment, the first waveform is OFDM with transform precoding enabled, and the second waveform is OFDM with transform precoding disabled.

Embodiment 10

Figures 10, 11:
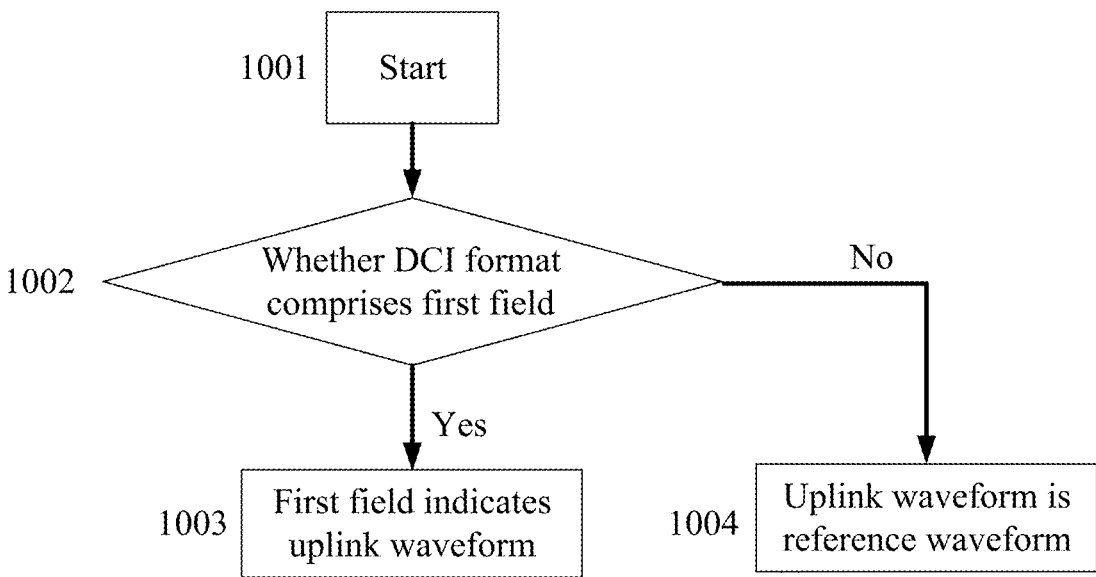
FIG. 10 illustrates a schematic diagram of a reference waveform according to one embodiment of the present application.
FIG. 11 illustrates a schematic diagram of a first MCS set according to one embodiment of the present application.

Embodiment 10 illustrates a schematic diagram of a reference waveform according to one embodiment of the present application, as shown in FIG. 10. In FIG. 10, each rectangle represents an operation, and each diamond represents a judgment; starting from 1001, in 1002 judge whether a DCI format comprises a first field, in 1003 the first field indicates uplink waveform, and in 1004 the uplink waveform is a reference waveform.

In embodiment 10, the second information block in the present application is used to determine a reference waveform, and the reference waveform is one of the X1 candidate waveforms in the present application; the reference waveform is a default waveform adopted for an uplink transmission when the first field is absent.

In one embodiment, a target waveform and a reference waveform provide a fallback mechanism for dynamic waveform configuration, ensuring a clear understanding of the uplink transmission waveform by the UE.

In one embodiment, the reference waveform is an OFDM using CP with switchable transform precoding.

In one embodiment, the reference waveform is generated by Inverse Discrete Fourier Transform (IDFT) or Inverse Fast Fourier Transform (IFFT) at baseband.

In one embodiment, the reference waveform is generated through precoding transform and OFDM.

In one embodiment, the reference waveform is a Cyclic Prefix Orthogonal Frequency Division Multiplexing (CP-OFDM), or the reference waveform is a Discrete Fourier Transform Prepare Orthogonal Frequency Division Multiplexing (DFT-S-OFDM).

In one embodiment, the reference waveform is a Single Carrier Frequency Division Multiple Access (SC-FDMA), or the reference waveform is a Circularly Pulse Shaped Orthogonal Frequency Division Multiplexing (CPS-OFDM), or the reference waveform is a Filter Bank Orthogonal Frequency Division Multiplexing (FB-OFDM).

In one embodiment, the reference waveform is one of Cyclic Prefix Less Precoded OFDM (CPLP-OFDM), a Flexibly Configured OFDM (FC-OFDM), a Flexible CP-OFDM (FCP-OFDM), a Flexi-OFDM, a Unique Word Discrete Fourier Transform spread Orthogonal Frequency Division Multiplexing (UW DFT-S-OFDM), an Orthogonal Time Frequency Space (OTFS), a Windowed OFDM (W-OFDM), and a Filtered OFDM (F-OFDM).

In one embodiment, the reference waveform is the same as the target waveform.

In one embodiment, the reference waveform is different from the target waveform.

In one embodiment, the technical feature that "the reference waveform is a default waveform adopted by uplink transmission when the first field is absent" comprises the following meaning: the reference waveform is a waveform adopted for uplink transmission scheduled by a DCI format scheduling an uplink transmission that does not comprise the first field.

In one embodiment, the technical feature that "the reference waveform is a default waveform adopted by uplink transmission when the first field is absent" comprises the following meaning: the reference waveform is a waveform adopted by a PUSCH scheduled by a DCI format scheduling a PUSCH that does not comprise the first field.

In one embodiment, the technical feature that "the reference waveform is a default waveform adopted by uplink transmission when the first field is absent" comprises the following meaning: the reference waveform is a waveform adopted by a PUSCH scheduled by DCI format 0_0.

In one embodiment, the technical feature that "the reference waveform is a default waveform adopted by uplink transmission when the first field is absent" comprises the following meaning: the reference waveform is a waveform adopted by the first node to transmit a PUSCH when the first information block is not provided or configured.

In one embodiment, the technical feature that "the reference waveform is a default waveform adopted by uplink transmission when the first field is absent" comprises the following meaning: the reference waveform is a waveform adopted by the first node to transmit a PUSCH when the first information block indicates that dynamically enabling/disabling or on/off transform precoding (or transform precoder) is not enabled.

In one embodiment, the technical feature that "the reference waveform is a default waveform adopted by uplink transmission when the first field is absent" comprises the following meaning: the reference waveform is a waveform adopted by the first node to transmit a PUSCH when the first information block is not provided or configured, or when the first information block indicates that dynamically enabling/disabling or on/off transform precoding (or transform precoder) is not enabled.

In one embodiment, the technical feature that "the reference waveform is a default waveform adopted by uplink transmission when the first field is absent" comprises the following meaning: the reference waveform is a waveform adopted by the first node to transmit a PUSCH when the first information block indicates that dynamic conversion of an uplink waveform is not enabled.

In one embodiment, the technical feature that "the reference waveform is a default waveform adopted by uplink transmission when the first field is absent" comprises the following meaning: the reference waveform is a waveform adopted by the first node to transmit a PUSCH when the first information block is not provided or configured, or when the first information block indicates that dynamic transform of uplink waveform is not enabled.

In one embodiment, the technical feature that "the reference waveform is a default waveform adopted by uplink transmission when the first field is absent" comprises the following meaning: the reference waveform is a waveform corresponding to enabling/disabling configuration of transform precoding (or transform precoder) when the first field is default.

Embodiment 11

Embodiment 11 illustrates a schematic diagram of a first MCS set according to one embodiment of the present application, as shown in FIG. 11. The table in FIG. 11 represents a first MCS set, each row represents an MCS comprised in a first MCS set, the first column of the left represents an MCS index, "$a_0$, $a_1$, $a_2$, $a_3$, $a_4$, $a_5$, $a_6$, $a_7$, $a_8$, ..., $a_R$" in the second column of the left represents modulation orders respectively, "$b_0$, $b_1$, $b_2$, $b_3$, $b_4$, $b_5$, $b_6$, $b_7$, $b_8$, ..., $b_R$" in the third column of the left represents a target code rate, and "$c_0$, $c_1$, $c_2$, $c_3$, $c_4$, $c_5$, $c_6$, $c_7$, $c_8$, ..., $c_R$" in the fourth column of the left represents spectral efficiency.

In embodiment 11, an MCS adopted by the first PUSCH in the present application belongs to a first MCS set, the first MCS set multiple MCSs, the first DCI format in the present application is used to determine an MCS adopted by the first PUSCH from the first MCS set, and the target waveform in the present application is used to determine the first MCS set.

In one embodiment, an MCS adopted by the first PUSCH is an MCS comprised in the first MCS set.

In one embodiment, an MCS adopted by the first PUSCH is a group of modulation order adopted to generate a modulation symbol of the first PUSCH, target code rate adopted to generate the first PUSCH, and the spectral efficiency of the first PUSCH.

In one embodiment, a number of MCS(s) comprised in the first MCS set is not greater than 32.

In one embodiment, a number of MCS(s) comprised in the first MCS set is equal to 32.

In one embodiment, any two MCSs comprised in the first MCS set are different.

In one embodiment, the first MCS set comprises a reserved MCS.

In one embodiment, the first MCS set does not comprises a reserved MCS.

In one embodiment, the first MCS set is an MCS table.

In one embodiment, any MCS comprised in the first MCS set is a group of modulation order, target code rate and spectral efficiency.

In one embodiment, the technical feature that "the first DCI format is used to determine an MCS adopted by the first PUSCH from the first MCS set" comprises the following meaning: the first DCI format is used by the first node in the present application to determine an MCS adopted by the first PUSCH from the first MCS set.

In one embodiment, the technical feature that "the first DCI format is used to determine an MCS adopted by the first PUSCH from the first MCS set" comprises the following meaning: a field comprised in the first DCI format is used to explicitly or implicitly indicate an MCS adopted by the first PUSCH from the first MCS set.

In one embodiment, the technical feature that "the first DCI format is used to determine an MCS adopted by the first PUSCH from the first MCS set" comprises the following meaning: a field comprised in the first DCI format is used to explicitly or implicitly indicate an index of an MCS adopted by the first PUSCH in the first MCS set.

In one embodiment, the technical feature that "the first DCI format is used to determine an MCS adopted by the first PUSCH from the first MCS set" comprises the following meaning: MCSs comprised in the first MCS set are sequentially indexed, and a field comprised in the first DCI format is used to explicitly or implicitly indicate an index of an MCS adopted by the first PUSCH in the first MCS set.

In one embodiment, the technical feature that "the first DCI format is used to determine an MCS adopted by the first PUSCH from the first MCS set" comprises the following meaning: MCSs comprised in the first MCS set are sequentially indexed, and the second field comprised in the first DCI format is used to explicitly or implicitly indicate an index of an MCS adopted by the first PUSCH in the first MCS set.

In one embodiment, the technical feature that "the first DCI format is used to determine an MCS adopted by the first PUSCH from the first MCS set" comprises the following meaning: MCSs comprised in the first MCS set are sequentially indexed, and an "MCS" field comprised in the first DCI format is used to explicitly or implicitly indicate an index of an MCS adopted by the first PUSCH in the first MCS set.

In one embodiment, the technical feature that "the target waveform is used to determine the first MCS set" comprises the following meaning: the target waveform is used by the first node in the present application to determine the first MCS set.

In one embodiment, the technical feature that "the target waveform is used to determine the first MCS set" comprises the following meaning: the target waveform is used to determine the first MCS set from multiple MCS sets based on a predefined mapping relation or corresponding relation.

In one embodiment, the technical feature that "the target waveform is used to determine the first MCS set" comprises the following meaning: the target waveform is used to determine the first MCS set from multiple MCS sets based on a conditional relation.

In one embodiment, the technical feature that "the target waveform is used to determine the first MCS set" comprises the following meaning: when the target waveform is one of the X1 candidate waveforms, the first MCS set is an MCS set in a group of MCS sets; when the target waveform is another one of the X1 candidate waveforms, the first MCS set is an MCS set in another one group of MCS sets.

In one embodiment, the technical feature that "the target waveform is used to determine the first MCS set" comprises the following meaning: the target waveform is used to determine an MCS set group to which the first MCS set belongs, and an MCS set group to which the first MCS set belongs comprises at least one MCS set.

In one embodiment, the technical feature that "the target waveform is used to determine the first MCS set" comprises the following meaning: when the target waveform is one of the X1 candidate waveforms, the first MCS set is an MCS set; when the target waveform is another one of the X1 candidate waveforms, the first MCS set is another MCS set.

In one embodiment, the technical feature that "the target waveform is used to determine the first MCS set" comprises the following meaning: the X1 candidate waveforms respectively correspond to X1 MCS set groups, and any MCS set group in the X1 MCS set groups comprises at least one MCS set; a set group corresponding to the target waveform among the X1 MCS set groups comprises the first MCS set.

In one embodiment, the technical feature that "the target waveform is used to determine the first MCS set" comprises the following meaning: the target waveform and the first DCI format are both used to determine the first MCS set.

In one embodiment, the technical feature that "the target waveform is used to determine the first MCS set" comprises the following meaning: the target waveform and a configuration signaling of a PUSCH are both used to determine the first MCS set.

In one embodiment, the technical feature that "the target waveform is used to determine the first MCS set" comprises the following meaning: the target waveform and a scrambling code of a CRC of a PDCCH carrying the first DCI format are both used to determine the first MCS set.

In one embodiment, the technical feature that "the target waveform is used to determine the first MCS set" comprises the following meaning: the target waveform and at least one of the first DCI format, a configuration signaling of a PUSCH, or a scrambling code of a CRC of a PDCCH carrying the first DCI format are used together to determine the first MCS set.

Embodiment 12

Figure 12:
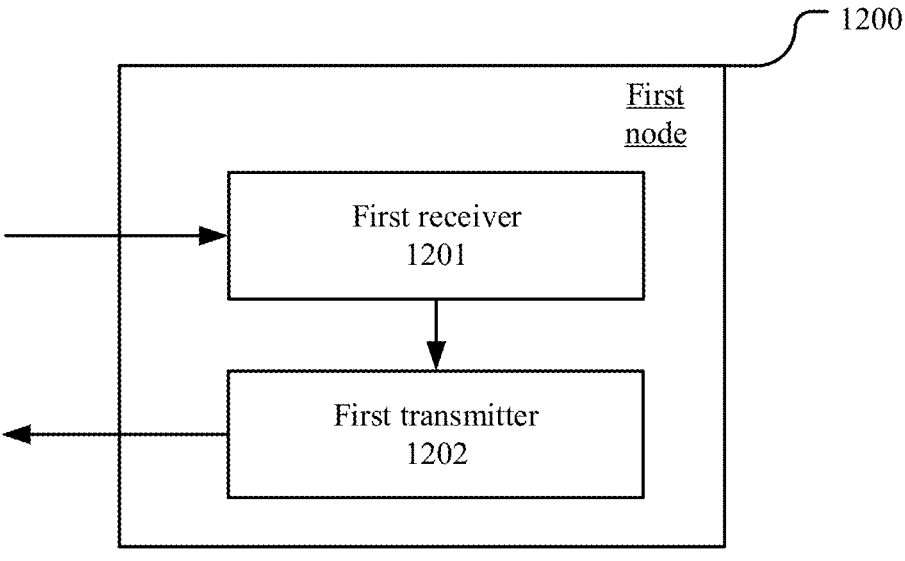
FIG. 12 illustrates a structure block diagram of a processor in a first node according to one embodiment of the present application.

Embodiment 12 illustrates the structure diagram of a processor in a first node, as shown in FIG. 12. In FIG. 12, a processor 1200 in the first node is comprised of a first receiver 1201 and a first transmitter 1202. The first receiver 1201 comprises the transmitter/receiver 456 (including the antenna 460), the receiving processor 452 and the controller/processor 490 in FIG. 4 of the present application; the first transmitter 1202 comprises the transmitter/receiver 456 (including the antenna 460), the transmitting processor 455 and the controller/processor 490 in FIG. 4 of the present application.

In embodiment 12, the first receiver 1201 receives a first information block and receives a first DCI format, and the first information is used to determine the first DCI format; the first transmitter 1202 transmits a first PUSCH, a waveform adopted by the first PUSCH is a target waveform, the target waveform is one of X1 candidate waveforms, X1 being a positive integer greater than 1; herein, the first DCI format at least comprises a first field and a second field, and the first field and the second field are respectively two different fields; a value of the first field comprised in the first DCI format is used to determine the target waveform from the X1 candidate waveforms; a target power value is equal to a transmission power value of the first PUSCH, and the target power value is equal to a smaller value between a first upper limit value or a first power value; a first parameter value is used to determine the first upper limit value, and the first parameter value is related to the target waveform; a second parameter value is used to determine the first power value, the second parameter value is related to both a value of the second field comprised in the first DCI format and the target waveform.

In one embodiment, a value of the second field comprised in the first DCI format is used to determine a BPRE value of the first PUSCH, the first power value is linearly correlated with the second parameter value, and a unit of the first power value is dBm; a characteristic sub-parameter value and a BPRE value of the first PUSCH are both used to determine the second parameter value; the characteristic sub-parameter value belongs to a first sub-parameter value set, the first sub-parameter value set comprises at least one sub-parameter value, and the first sub-parameter value set is predefined or configured; the target waveform is used to determine the characteristic sub-parameter value from the first sub-parameter value set.

In one embodiment, the first DCI format is used to determine a target offset value, and the target waveform is used to determine a power control adjustment state adopted by the first PUSCH; the target offset value belongs to a first offset value set, the first offset value set comprises at least one offset value, any offset value comprised in the first offset value set is for a power control adjustment state adopted by the first PUSCH, and a sum of all offset values comprised in the first offset value set is used to determine the second parameter value.

In one embodiment, the first PUSCH carries a first report, the first report is used to indicate a difference value between the first upper limit value and the target power value, and the first DCI format is an earliest DCI format after the first report is triggered.

In one embodiment, the first DCI format comprises a third field, a target size is equal to a size of the third field comprised in the first DCI format, and the target size is equal to a maximum candidate size among multiple candidate sizes corresponding to the X1 candidate waveforms.

In one embodiment, the first receiver 1201 receives a second information block; herein, the second information block is used to determine a reference waveform, and the reference waveform is one of the X1 candidate waveforms; the reference waveform is a default waveform adopted for an uplink transmission when the first field is absent.

In one embodiment, an MCS adopted by the first PUSCH belongs to a first MCS set, the first MCS set comprises multiple MCSs, the first DCI format is used to determine an MCS adopted by the first PUSCH from the first MCS set, and the target waveform is used to determine the first MCS set.

Embodiment 13

Figure 13:
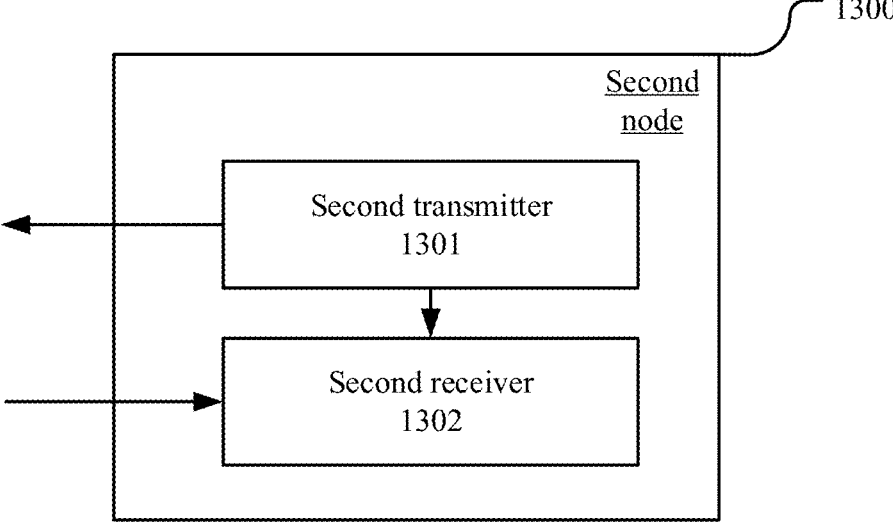
FIG. 13 illustrates a structure block diagram of a processor in second node according to one embodiment of the present application.

Embodiment 13 illustrates the structure diagram of a processor in a second node, as shown in FIG. 13. In FIG. 13, a processor 1300 in the second node is comprised of a second transmitter 1301 and a second receiver 1302. The second transmitter 1301 comprises the transmitter/receiver 416 (including the antenna 460), the transmitting processor 415 and the controller/processor 440 in FIG. 4 of the present application; the second receiver 1302 comprises the transmitter/receiver 416 (including the antenna 460), the receiving processor 412 and the controller/processor 440 in FIG. 4 of the present application.

In embodiment 13, the second transmitter 1301 transmits a first information block and transmits a first DCI format, the first information block is used to determine the first DCI format; the second receiver 1302 receives a first PUSCH, a waveform adopted by the first PUSCH is a target waveform, the target waveform is one of X1 candidate waveforms, X1 being a positive integer greater than 1; herein, the first DCI format at least comprises a first field and a second field, and the first field and the second field are respectively two different fields; a value of the first field comprised in the first DCI format is used to determine the target waveform from the X1 candidate waveforms; a target power value is equal to a transmission power value of the first PUSCH, and the target power value is equal to a smaller value between a first upper limit value or a first power value; a first parameter value is used to determine the first upper limit value, and the first parameter value is related to the target waveform; a second parameter value is used to determine the first power value, the second parameter value is related to both a value of the second field comprised in the first DCI format and the target waveform.

In one embodiment, a value of the second field comprised in the first DCI format is used to determine a BPRE value of the first PUSCH, the first power value is linearly correlated with the second parameter value, and a unit of the first power value is dBm; a characteristic sub-parameter value and a BPRE value of the first PUSCH are both used to determine the second parameter value; the characteristic sub-parameter value belongs to a first sub-parameter value set, the first sub-parameter value set comprises at least one sub-parameter value, and the first sub-parameter value set is predefined or configured; the target waveform is used to determine the characteristic sub-parameter value from the first sub-parameter value set.

In one embodiment, the first DCI format is used to determine a target offset value, and the target waveform is used to determine a power control adjustment state adopted by the first PUSCH; the target offset value belongs to a first offset value set, the first offset value set comprises at least one offset value, any offset value comprised in the first offset value set is for a power control adjustment state adopted by the first PUSCH, and a sum of all offset values comprised in the first offset value set is used to determine the second parameter value.

In one embodiment, the first PUSCH carries a first report, the first report is used to indicate a difference value between the first upper limit value and the target power value, and the first DCI format is an earliest DCI format after the first report is triggered.

In one embodiment, the first DCI format comprises a third field, a target size is equal to a size of the third field comprised in the first DCI format, and the target size is equal to a maximum candidate size among multiple candidate sizes corresponding to the X1 candidate waveforms.

In one embodiment, the second transmitter 1301 transmits a second information block; herein, the second information block is used to determine a reference waveform, and the reference waveform is one of the X1 candidate waveforms; the reference waveform is a default waveform adopted for an uplink transmission when the first field is absent.

In one embodiment, an MCS adopted by the first PUSCH belongs to a first MCS set, the first MCS set comprises multiple MCSs, the first DCI format is used to determine an MCS adopted by the first PUSCH from the first MCS set, and the target waveform is used to determine the first MCS set.

The ordinary skill in the art may understand that all or part of steps in the above method may be implemented by instructing related hardware through a program. The program may be stored in a computer readable storage medium, for example Read-Only Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The first node or the second node in the present application includes but is not limited to mobile phones, tablet computers, notebooks, network cards, low-consumption equipment, enhanced MTC (eMTC) terminals, NB-IOT terminals, vehicle-mounted communication equipment, aircrafts, diminutive airplanes, unmanned aerial vehicles, telecontrolled aircrafts and other wireless communication devices. The base station or network side equipment in the present application includes but is not limited to macro-cellular base stations, micro-cellular base stations, home base stations, relay base station, eNB, gNB, Transmitter Receiver Point (TRP), relay satellites, satellite base stations, space base stations and other radio communication equipment.

It will be appreciated by those skilled in the art that this disclosure can be implemented in other designated forms without departing from the core features or fundamental characters thereof. The currently disclosed embodiments, in any case, are therefore to be regarded only in an illustrative, rather than a restrictive sense. The scope of invention shall be determined by the claims attached, rather than according to previous descriptions, and all changes made with equivalent meaning are intended to be included therein.

What is claimed is:

1. A user equipment (UE) configured for wireless communications, the UE comprising:
   a receiver;
   a transmitter; and
   a processor, wherein:
   the receiver is configured to receive a first information block;
   the receiver is further configured to receive a downlink control information (DCI), wherein a format of the DCI is based on the first information block, wherein the DCI comprises at least a first field and a second field;
   the processor is configured to determine a target waveform, wherein the target waveform is from a plurality of candidate waveforms, wherein the target waveform is determined based on a value of the first field comprised in the DCI; and
   the transmitter is configured to send a physical uplink shared channel (PUSCH) transmission, using the determined target waveform, and using a target power value, wherein
   the target power value is equal to a smaller value between of a first upper limit value or a first power value, wherein a first parameter value is used to determine the first upper limit value, wherein the first parameter value is related to the target waveform, wherein a second parameter value is used to determine the first power value, and wherein the second parameter value is related to both a value of the second field comprised in the DCI and the target waveform.

2. The UE of claim 1, wherein the value of the second field comprised in the DCI is used to determine a bit per resource element (BPRE) value of the PUSCH transmission, wherein the first power value is linearly correlated with the second parameter value, and wherein a unit of the first power value is dBm, wherein a characteristic sub-parameter value and the BPRE value of the PUSCH transmission are both used to determine the second parameter value, wherein the characteristic sub-parameter value belongs to a first sub-parameter value set, wherein the first sub-parameter value set comprises at least one sub-parameter value, wherein the first sub-parameter value set is predefined or configured, and wherein the target waveform is used to determine the characteristic sub-parameter value from the first sub-parameter value set.

3. The UE of claim 1, wherein the DCI is used to determine a target offset value, wherein the target waveform is used to determine a power control adjustment state for the PUSCH transmission, wherein the target offset value belongs to a first offset value set, wherein the first offset value set comprises at least one offset value, wherein any offset value comprised in the first offset value set is for a power control adjustment state for the PUSCH transmission, and wherein a sum of all offset values comprised in the first offset value set is used to determine the second parameter value.

4. The UE of claim 1, wherein the PUSCH transmission carries a report, wherein the report is used to indicate a difference value between the first upper limit value and the target power value, and wherein the DCI is an earliest DCI after the report is triggered.

5. The UE of claim 1, wherein the DCI comprises a third field, wherein a target size is equal to a size of the third field comprised in the DCI, and wherein the target size is equal to a maximum candidate size among multiple candidate sizes corresponding to the plurality of candidate waveforms.

6. The UE of claim 1, wherein the receiver is further configured to receive a second information block, wherein the second information block is used to determine a reference waveform, wherein the reference waveform is one of the plurality of candidate waveforms, and wherein the reference waveform is a default waveform used for an uplink transmission when the first field is absent.

7. The UE of claim 1, wherein a modulation and coding scheme (MCS) used by the PUSCH transmission belongs to an MCS set, wherein the MCS set comprises multiple MCSs, wherein the DCI is used to determine an MCS used by the PUSCH transmission from the MCS set, and wherein the target waveform is used to determine the MCS set.

8. A method for use in a user equipment (UE) configured for wireless communications, the method comprising:
   receiving a first information block;
   receiving a downlink control information (DCI), wherein a format of the DCI is based on the first information block, wherein the DCI comprises at least a first field and a second field;
   determining a target waveform, wherein the target waveform is from a plurality of candidate waveforms, wherein the target waveform is determined based on a value of the first field comprised in the DCI; and sending a physical uplink shared channel (PUSCH) transmission, using the determined target waveform, and using a target power value, wherein
   the target power value is equal to a smaller value of a first upper limit value or a first power value, wherein a first parameter value is used to determine the first upper limit value, wherein the first parameter value is related to the target waveform, wherein a second parameter value is used to determine the first power value, and wherein the second parameter value is related to both a value of the second field comprised in the DCI and the target waveform.

9. The method of claim 8, wherein the value of the second field comprised in the DCI is used to determine a bit per resource element (BPRE) value of the PUSCH transmission, wherein the first power value is linearly correlated with the second parameter value, wherein a unit of the first power value is dBm, wherein a characteristic sub-parameter value and the BPRE value of the PUSCH transmission are both used to determine the second parameter value, wherein the characteristic sub-parameter value belongs to a first sub-parameter value set, wherein the first sub-parameter value set comprises at least one sub-parameter value, wherein the first sub-parameter value set is predefined or configured, and wherein the target waveform is used to determine the characteristic sub-parameter value from the first sub-parameter value set.

10. The method of claim 8, wherein the DCI is used to determine a target offset value, wherein the target waveform is used to determine a power control adjustment state for the PUSCH transmission, wherein the target offset value belongs to a first offset value set, wherein the first offset value set comprises at least one offset value, wherein any offset value comprised in the first offset value set is for a power control adjustment state for the PUSCH transmission, and wherein a sum of all offset values comprised in the first offset value set is used to determine the second parameter value.

11. The method of claim 8, wherein the PUSCH transmission carries a report, wherein the report is used to indicate a difference value between the first upper limit value and the target power value, and wherein the DCI is an earliest DCI after the first report is triggered.

12. The method of claim 8, wherein the DCI comprises a third field, wherein a target size is equal to a size of the third field comprised in the DCI, and wherein the target size is equal to a maximum candidate size among multiple candidate sizes corresponding to the plurality of candidate waveforms.

13. The method of claim 8, further comprising:
   receiving a second information block, wherein the second information block is used to determine a reference waveform, wherein the reference waveform is one of the plurality of candidate waveforms, and wherein the reference waveform is a default waveform used for an uplink transmission when the first field is absent.

14. The method of claim 8, wherein a modulation and coding scheme (MCS) used by the PUSCH transmission belongs to an MCS set, wherein the MCS set comprises multiple MCSs, wherein the DCI is used to determine an MCS used by the PUSCH transmission from the MCS set, and wherein the target waveform is used to determine the MCS set.

* * * * *